US008277745B2

(12) United States Patent
Mehus et al.

(10) Patent No.: US 8,277,745 B2
(45) Date of Patent: Oct. 2, 2012

(54) INTERCHANGEABLE LOAD CELL ASSEMBLIES

(75) Inventors: Richard J. Mehus, Richfield, MN (US); Henry J. McCarrick, Valley Center, CA (US); Bruce W. Weber, Stillwater, MN (US); Ben J. Wiltsie, Eagan, MN (US)

(73) Assignee: Ecolab Inc., St. Paul, MN (US)

( * ) Notice: Subject to any disclaimer, the term of this patent is extended or adjusted under 35 U.S.C. 154(b) by 1123 days.

(21) Appl. No.: 11/799,692

(22) Filed: May 2, 2007

(65) Prior Publication Data

US 2008/0271928 A1 Nov. 6, 2008

(51) Int. Cl.
*B01D 11/02* (2006.01)
*G01G 19/00* (2006.01)

(52) U.S. Cl. ........................................ 422/264; 177/199

(58) Field of Classification Search .................. 422/264; 177/199

See application file for complete search history.

(56) References Cited

U.S. PATENT DOCUMENTS

| | | | |
|---|---|---|---|
| 33,861 | A | 12/1861 | Whitney |
| 1,985,615 | A | 12/1934 | Mitchell |
| 2,219,597 | A | 10/1940 | Lutz |
| 2,254,269 | A | 9/1941 | Clark et al. |
| 2,319,739 | A | 5/1943 | Kessler |
| 2,333,791 | A | 11/1943 | Hutchinson, Jr. |
| 2,594,975 | A | 4/1952 | Mylting |
| 2,679,374 | A | 5/1954 | Mylting |
| 2,714,472 | A | 8/1955 | Richardson |
| 2,990,707 | A | 7/1961 | Gerhardt et al. |
| 3,091,327 | A | 5/1963 | Lalley |
| 3,136,157 | A | 6/1964 | Seed et al. |
| 3,197,980 | A | 8/1965 | Marple |
| 3,412,254 | A | 11/1968 | Meyer-Doering et al. |
| 3,447,906 | A | 6/1969 | Zimmerli |
| 3,526,334 | A | 9/1970 | Ashton et al. |
| 3,656,478 | A | 4/1972 | Swersey |
| 3,743,598 | A | 7/1973 | Field |
| 3,754,871 | A | 8/1973 | Hessel et al. |
| 3,760,166 | A | 9/1973 | Adams et al. |
| 3,772,193 | A | 11/1973 | Nelli et al. |
| 3,774,056 | A | 11/1973 | Sample et al. |

(Continued)

FOREIGN PATENT DOCUMENTS

DE 3933763 A 4/1991

(Continued)

OTHER PUBLICATIONS

Presentation, "ECOLAB Aramark Uniform Services Joining Forces for Service Excellence", Date Unknown, 69 pgs.

(Continued)

*Primary Examiner* — Kevin Joyner

(74) *Attorney, Agent, or Firm* — Shumaker & Sieffert, P.A.

(57) ABSTRACT

A mass-based dispensing system includes a set of interchangeable load cell assemblies. The load cell assemblies are sized to be interchangeably received into a mass-based product dispenser. Each of the interchangeable load cell assemblies has a maximum rated load that is different from the maximum rated load of the other load cell assemblies. The interchangeable load cell assemblies are substantially modular (i.e., have substantially similar external geometries), thus enabling the product dispenser to interchangeably receive the load cells. The interchangeable load cell assemblies enable a single product dispenser to accommodate a broad range of differently weighted products and/or product containers.

18 Claims, 10 Drawing Sheets

U.S. PATENT DOCUMENTS 3,826,113 A 7/1974 Noraas et al.
3,826,408 A 7/1974 Berndt et al.
3,828,869 A 8/1974 Sellers
3,834,587 A 9/1974 Bengt et al.
4,040,515 A 8/1977 Hessel et al.
4,046,996 A 9/1977 Williams et al.
4,076,146 A 2/1978 Lausberg et al.
4,195,500 A 4/1980 Tobita et al.
4,199,001 A 4/1980 Kratz
4,211,517 A 7/1980 Schmid
4,219,089 A * 8/1980 Gard et al. .................... 177/165
4,222,496 A 9/1980 Start et al.
4,241,400 A 12/1980 Kiefer
4,247,396 A 1/1981 Buesing
4,265,266 A 5/1981 Kierbow et al.
4,307,787 A 12/1981 Raboud et al.
4,320,855 A 3/1982 Ricciardi et al.
4,334,784 A 6/1982 Engels
4,353,482 A 10/1982 Tomlinson et al.
4,373,418 A 2/1983 Rhodes et al.
4,396,828 A 8/1983 Dino et al.
4,402,426 A 9/1983 Faulkner et al.
4,404,639 A 9/1983 McGuire et al.
4,433,917 A 2/1984 Mendel et al.
4,463,844 A * 8/1984 Huffman et al. .............. 194/213
4,482,785 A 11/1984 Finnegan et al.
4,486,910 A 12/1984 Saalmann et al.
4,509,543 A 4/1985 Livingston et al.
4,513,796 A 4/1985 Miller et al.
4,526,215 A 7/1985 Harrison et al.
4,573,606 A 3/1986 Lewis et al.
RE32,101 E 4/1986 Ricciardi et al.
RE32,102 E 4/1986 Ricciardi et al.
4,597,091 A 6/1986 Blake
4,630,654 A 12/1986 Kennedy, Jr.
4,632,198 A 12/1986 Uchimura
4,660,667 A 4/1987 Uchimura et al.
4,676,399 A 6/1987 Burckhardt
4,690,230 A 9/1987 Uchimura et al.
4,690,305 A 9/1987 Copeland
4,697,243 A 9/1987 Moore et al.
4,707,848 A 11/1987 Durston et al.
4,711,370 A 12/1987 Goudy, Jr. et al.
4,733,971 A 3/1988 Pratt
4,756,321 A 7/1988 Livingston et al.
4,766,548 A 8/1988 Cedrone et al.
4,770,859 A 9/1988 Heiser, Jr.
4,789,014 A 12/1988 DiGianfilippo et al.
4,826,661 A 5/1989 Copeland et al.
4,830,508 A 5/1989 Higuchi et al.
4,834,546 A * 5/1989 Putz .............................. 366/141
4,836,685 A 6/1989 Verreault
4,837,811 A 6/1989 Butler et al.
4,843,579 A 6/1989 Andrews et al.
4,845,965 A 7/1989 Copeland et al.
4,848,381 A 7/1989 Livingston et al.
4,858,449 A 8/1989 Lehn
4,867,196 A 9/1989 Zetena et al.
4,867,343 A 9/1989 Ricciardi et al.
4,872,763 A 10/1989 Higuchi et al.
4,908,190 A 3/1990 Maglio et al.
4,938,240 A 7/1990 Lakhan et al.
4,961,887 A 10/1990 Crumpler et al.
4,964,185 A 10/1990 Lehn
4,967,811 A 11/1990 DiGianfilippo et al.
4,969,011 A 11/1990 Faull et al.
4,976,137 A 12/1990 Decker et al.
4,980,292 A 12/1990 Elbert et al.
4,999,124 A 3/1991 Copeland
5,014,211 A 5/1991 Turner et al.
5,014,877 A 5/1991 Roos
5,024,352 A 6/1991 Gmür et al.
5,036,479 A 7/1991 Prednis et al.
5,038,807 A 8/1991 Bailey et al.
5,040,699 A 8/1991 Gangemi
5,043,860 A 8/1991 Koether et al.
5,053,206 A 10/1991 Maglio et al.
5,064,094 A 11/1991 Roos et al.
5,115,842 A 5/1992 Crafts et al.
5,136,281 A 8/1992 Bonaquist
5,147,615 A 9/1992 Bird et al.
5,203,366 A 4/1993 Czeck et al.
5,208,930 A 5/1993 Chabard
5,219,224 A 6/1993 Pratt
5,222,027 A 6/1993 Williams et al.
5,240,326 A 8/1993 Evanson
5,268,153 A 12/1993 Muller
5,279,448 A 1/1994 Hanlin et al.
5,283,639 A 2/1994 Esch et al.
5,288,145 A 2/1994 Mackey et al.
5,294,022 A 3/1994 Earle
5,316,195 A 5/1994 Moksnes et al.
5,322,571 A 6/1994 Plummer et al.
5,332,311 A 7/1994 Volk, Jr. et al.
5,332,312 A 7/1994 Evanson
5,340,211 A 8/1994 Pratt
5,345,379 A 9/1994 Brous et al.
5,369,032 A 11/1994 Pratt
5,370,267 A 12/1994 Schroeder
5,389,344 A 2/1995 Copeland et al.
5,390,385 A 2/1995 Beldham
5,397,028 A 3/1995 Jesadanont
5,400,018 A 3/1995 Scholl et al.
5,404,893 A 4/1995 Brady et al.
5,407,598 A 4/1995 Olson et al.
5,411,716 A 5/1995 Thomas et al.
5,419,355 A 5/1995 Brennan et al.
5,427,748 A 6/1995 Wiedrich et al.
5,497,914 A 3/1996 Maltsis
5,500,050 A 3/1996 Chan et al.
5,505,915 A 4/1996 Copeland et al.
5,556,478 A 9/1996 Brady et al.
5,558,435 A 9/1996 Marjo
5,580,448 A 12/1996 Brandreth, III
5,584,025 A 12/1996 Keithley et al.
5,584,079 A 12/1996 Wong et al.
5,609,417 A 3/1997 Otte
5,619,183 A 4/1997 Ziegra et al.
5,625,659 A 4/1997 Sears
5,625,908 A 5/1997 Shaw
5,636,008 A 6/1997 LoBiondo et al.
5,638,417 A 6/1997 Boyer et al.
5,653,269 A 8/1997 Miller et al.
5,671,262 A 9/1997 Boyer et al.
5,679,173 A 10/1997 Hartman
5,681,400 A 10/1997 Brady et al.
5,694,323 A 12/1997 Koropitzer et al.
5,695,091 A 12/1997 Winings et al.
5,724,261 A 3/1998 Denny et al.
5,745,381 A 4/1998 Tanaka et al.
5,757,664 A 5/1998 Rogers et al.
5,758,300 A 5/1998 Abe
5,759,501 A 6/1998 Livingston et al.
5,761,278 A 6/1998 Pickett et al.
5,762,096 A 6/1998 Mirabile
5,769,536 A 6/1998 Kotylak
5,777,895 A 7/1998 Kuroda et al.
H1743 H 8/1998 Graves et al.
5,821,523 A 10/1998 Bunte et al.
5,826,749 A 10/1998 Howland et al.
5,827,486 A 10/1998 Crossdale
5,839,097 A 11/1998 Klausner
5,851,291 A 12/1998 Poterala et al.
5,861,881 A 1/1999 Freeman et al.
5,864,783 A 1/1999 Struck et al.
5,875,430 A 2/1999 Koether
5,885,446 A 3/1999 McGrew, Jr.
5,887,975 A 3/1999 Mordaunt et al.
5,897,671 A 4/1999 Newman et al.
5,902,749 A 5/1999 Lichtwardt et al.
5,913,915 A 6/1999 McQuinn
5,931,877 A 8/1999 Smith et al.
5,933,479 A 8/1999 Michael et al.
5,939,974 A 8/1999 Heagle et al.
5,945,910 A 8/1999 Gorra
5,956,487 A 9/1999 Venkatraman et al.
5,961,561 A 10/1999 Wakefield, II 5,967,202 A 10/1999 Mullen et al.
5,973,696 A 10/1999 Agranat et al.
5,974,345 A 10/1999 Buck et al.
5,975,352 A 11/1999 Spriggs et al.
5,979,703 A 11/1999 Nystrom
5,980,090 A 11/1999 Royal, Jr. et al.
5,987,105 A 11/1999 Jenkins et al.
5,992,686 A 11/1999 Cline et al.
6,003,070 A 12/1999 Frantz
6,007,788 A 12/1999 Bellon et al.
6,012,041 A 1/2000 Brewer et al.
6,029,286 A 2/2000 Funk
6,049,792 A 4/2000 Hart et al.
6,061,668 A 5/2000 Sharrow
6,073,124 A 6/2000 Krishnan et al.
6,082,149 A 7/2000 Woods
6,098,843 A 8/2000 Soberanis et al.
6,120,175 A 9/2000 Tewell
6,129,449 A 10/2000 McCain et al.
6,133,555 A 10/2000 Brenn
6,136,184 A 10/2000 King
6,143,257 A 11/2000 Spriggs et al.
6,164,189 A 12/2000 Anson
6,167,358 A 12/2000 Othmer et al.
6,220,312 B1 4/2001 Hirsch et al.
6,234,218 B1 5/2001 Boers
6,249,778 B1 * 6/2001 Vaghi .......................... 705/407
6,259,956 B1 7/2001 Myers et al.
6,269,975 B2 8/2001 Soberanis et al.
6,321,204 B1 11/2001 Kazami et al.
6,330,499 B1 12/2001 Chou et al.
6,356,205 B1 3/2002 Salvo et al.
6,357,292 B1 3/2002 Schultz et al.
6,370,454 B1 4/2002 Moore
6,377,868 B1 4/2002 Gardner, Jr.
6,380,495 B1 4/2002 Ash et al.
6,418,371 B1 7/2002 Arnold
6,438,471 B1 8/2002 Katagishi et al.
6,441,322 B1 8/2002 Ash et al.
6,463,940 B1 10/2002 Thomas et al.
6,472,615 B1 10/2002 Carlson
6,490,513 B1 12/2002 Fish et al.
6,507,966 B1 1/2003 Mitchell et al.
6,513,964 B1 2/2003 Himmelright et al.
6,547,097 B1 4/2003 Cavallaro et al.
6,561,381 B1 5/2003 Osterheld et al.
6,697,706 B2 2/2004 Gardner, Jr.
6,707,873 B2 3/2004 Thompson et al.
6,719,453 B2 4/2004 Cosman et al.
6,792,395 B2 9/2004 Roberts
6,845,298 B2 1/2005 Nelson et al.
6,896,140 B1 5/2005 Perry
6,921,000 B2 7/2005 Wagner et al.
6,987,228 B1 1/2006 MacMichael et al.
7,069,188 B2 6/2006 Roberts
7,128,215 B2 10/2006 Danechi
7,201,290 B2 4/2007 Mehus et al.
7,410,623 B2 8/2008 Mehus et al.
7,694,589 B2 4/2010 Mehus et al.
7,740,152 B2 6/2010 Hughes et al.
7,891,523 B2 2/2011 Mehus et al.
2001/0023841 A1 9/2001 Zimmerman et al.
2001/0038018 A1 11/2001 Bell et al.
2001/0039501 A1 11/2001 Crevel et al.
2001/0047214 A1 11/2001 Cocking et al.
2001/0049846 A1 12/2001 Guzzi et al.
2001/0053939 A1 12/2001 Crevel et al.
2001/0054038 A1 12/2001 Crevel et al.
2002/0014496 A1 2/2002 Cline et al.
2003/0006281 A1 1/2003 Thomas et al.
2003/0031084 A1 2/2003 Bartos
2003/0033156 A1 2/2003 McCall
2003/0033396 A1 2/2003 McCall
2003/0043688 A1 3/2003 Peterson et al.
2003/0121561 A1 7/2003 Wagner et al.
2003/0195656 A1 10/2003 Gardner, Jr.
2004/0015269 A1 1/2004 Jungmann et al.
2004/0088076 A1 5/2004 Gardner, Jr.
2004/0162850 A1 8/2004 Sanville et al.
2004/0216500 A1 11/2004 Aouad
2004/0220844 A1 11/2004 Sanville et al.
2004/0226755 A1 11/2004 Pottebaum et al.
2004/0226956 A1 11/2004 Brooks
2004/0226959 A1 11/2004 Mehus et al.
2004/0230339 A1 11/2004 Maser et al.
2004/0232163 A1 11/2004 Reinsch et al.
2004/0245284 A1 12/2004 Mehus et al.
2005/0065644 A1 3/2005 Gardner, Jr.
2005/0072793 A1 * 4/2005 Mehus et al. .................. 222/77
2005/0102059 A1 5/2005 Gardner, Jr.
2005/0108044 A1 5/2005 Koster
2005/0144737 A1 7/2005 Roepke et al.
2005/0150952 A1 7/2005 Chung
2005/0252930 A1 11/2005 Contadini et al.
2005/0269348 A1 12/2005 Limback et al.
2006/0015536 A1 1/2006 Buchanan et al.
2006/0108415 A1 5/2006 Thomas et al.
2006/0173576 A1 8/2006 Goerg et al.
2006/0173896 A1 8/2006 Lyon et al.
2007/0000291 A1 1/2007 France et al.
2007/0154370 A1 7/2007 Mehus et al.
2008/0000699 A1 * 1/2008 Walker ........................... 177/60
2008/0058771 A1 3/2008 De Brabanter
2008/0195251 A1 8/2008 Milner
2009/0037026 A1 2/2009 Sostaric et al.
2009/0069934 A1 3/2009 Newman et al.
2009/0090564 A1 4/2009 Kresina
2009/0126123 A1 5/2009 Kim et al.
2009/0134997 A1 5/2009 Godlewski
2009/0171502 A1 7/2009 Freidin
2009/0294469 A1 12/2009 Poulain et al.
2010/0147876 A1 6/2010 Mehus et al.

FOREIGN PATENT DOCUMENTS

DE 4419415 A1 12/1995
DE 10016659 10/2001
DE 100 39 408 A1 12/2001
EP 0917906 A1 5/1999
GB 2 052 251 A1 1/1981
GB 2120563 A 12/1983
JP 59142832 A 8/1984
JP 60020122 A 2/1985
JP 60150823 A 8/1985
JP 61098657 A 5/1986
JP 62168529 A 7/1987
JP 63001434 A 1/1988
JP 01145525 A 6/1989
JP 01148916 A 6/1989
JP 01207124 A 8/1989
JP 04049110 A 2/1992
JP 06226068 8/1994
JP 09066995 3/1997
JP 09066999 3/1997
JP 11-502932 3/1999
JP 11156101 6/1999
WO WO 98/26704 6/1998
WO WO 03/059143 A1 7/2003
WO 2006133026 A2 12/2006

OTHER PUBLICATIONS

T-Jet 2000 PC “Wash-Aisle Productivity Manager Software Guide”, ECOLAB Textile Care Division, 28584/4001/0399 (9207-4327), Date Unknown, 29 pgs.

Sample Reports consisting of 9 pages, ECOLAB, 1995.

Sample Reports, NOVALINK System, 96-04620-00A, consisting of 8 pages, 1997.

NOVA Controls, NOVA News, “Save Money and Gain Sales Features?”, 1992 1 pg.

NOVALINK Overview Program Pricing, 1996, 1 pg.

Orion Liquid Laundry Supply Dispenser Feb. 1989, 5 pgs.

NOVALINK Laundry Information System, “ControlMaster Version 2.0 for Windows User’s Guide”, 2000, 39 pgs.

PerSyst Inc. “LDAS-2000 Remote Information Control and Management System for the Commercial Laundry and Vending Industry”, Date Unknown, 4 pgs.

PerSyst Inc. “Dial-A-Wash Automatic Laundry Room Attendant for Apartment and Complex Laundry Rooms”, Date Unknown, 2 pgs.

iNtOUCH Water Treatment Information Management Solution Statement of Work Presented to: ECOLAB (draft form), revised Mar. 30, 1999, 59 pgs.
Brochure, NOVALINK, "The Laundry Information System" from Nova Controls, 6 pgs, Date Unknown.
Diverlog-L Enhanced "DLE—Production Summary Reports", Diversey, 5 pgs., 1990.
Diverlog-L Enhanced "DLE—Set-up Report", Diversey, 1990, 7 pgs.
Diverlog-L Enhanced "DLE—Single Cycle Reports", Diversey, 5 pgs. 1990.
CLAX Diverflow System Advanced Central Dosing Technology for Laundries, 3 pgs., Sep. 10, 1999.
*We'd like to make a couple of things perfectly Clear*, Aquabalance Pool and Spa Management, Ecolab brochure, 4 pgs. 1998.
*White Paper, ECOLAB BALANCER. COM*, MRE , 4 pgs. Jun. 4, 1997.
*relax. We'Ve Got Your Pool Concerns Under Control*, ECOLAB Water Care Services, Ecolab, Inc. 1998, 4 pgs.
International Search Report and Written Opinion for PCT Application No. PCT/US2004/014667, dated Feb. 16, 2005, 18 pages.
U.S. Appl. No. 10/436,454, filed May 12, 2003, entitled, "Methods of Dispensing", Mehus et al.
U.S. Appl. No. 12/683,666, by Brian P. Carlson, filed Jan. 7, 2010.
U.S. Appl. No. 12/567,266, by Christopher A. Buck, filed Sep. 25, 2009.
Office Action dated Aug. 14, 2007, for U.S. Appl. No. 10/436,454, 5 pp.
Notice of Allowance mailed Nov. 29, 2007, for U.S. Appl. No. 10/436,454, 6 pp.
Office Action dated May 2, 2008, for U.S. Appl. No. 10/436,454, 5 pp.
Office Action dated Oct. 28, 2008, for U.S. Appl. No. 10/436,454, 5 pp.
Office Action dated Mar. 20, 2009, for U.S. Appl. No. 10/436,454, 7 pp.
Office Action dated Oct. 22, 2009, for U.S. Appl. No. 10/436,454, 9 pp.
Office Action dated Feb. 17, 2009, for U.S. Appl. No. 11/954,425, 14 pp.
Office Action dated Sep. 21, 2009, for U.S. Appl. No. 11/954,425, 14 pp.
Notice of Allowance mailed Dec. 17, 2009, for U.S. Appl. No. 11/954,425, 4 pp.
Office Action dated Jun. 7, 2005, for U.S. Appl. No. 10/437,257, 12 pp.
Office Action dated Nov. 25, 2005, for U.S. Appl. No. 10/437,257, 13 pp.
Notice of Allowance mailed Aug. 29, 2006, for U.S. Appl. No. 10/437,257, 8 pp.
Notice of Allowance mailed Dec. 1, 2006, for U.S. Appl. No. 10/437,257, 8 pp.
Office Action dated Jul. 24, 2007, for U.S. Appl. No. 10/843,230, 16 pp.
Office Action dated Nov. 28, 2007, for U.S. Appl. No. 10/843,230, 18 pp.
Office Action dated Jun. 17, 2008, for U.S. Appl. No. 10/843,230, 14 pp.
Office Action dated Sep. 4, 2008, for U.S. Appl. No. 10/843,230, 11 pp.
Office Action dated Mar. 27, 2009, for U.S. Appl. No. 10/843,230, 9 pp.
Office Action dated Nov. 2, 2009, for U.S. Appl. No. 10/843,230, 10 pp.
Office Action dated Jan. 19, 2010, for U.S. Appl. No. 10/843,230, 7 pp.
Office Action dated Feb. 9, 2007 for U.S. Appl. No. 10/843,219, 12 pp.
Office Action dated Jul. 24, 2007 for U.S. Appl. No. 10/843,219, 17 pp.
Office Action dated Jan. 10, 2008 for U.S. Appl. No. 10/843,219, 15 pp.
Notice of Allowance dated May 1, 2008 for U.S. Appl. No. 10/843,219, 8 pp.
Office Action dated Jul. 7, 2010 for U.S. Appl. No. 11/713,964, 8 pp.
Notice of Allowance dated Nov. 19, 2010 for U.S. Appl. No. 11/713,964, 8 pp.
Office Action dated Apr. 7, 2009, for U.S. Appl. No. 11/570,411, 16 pp.
Office Action dated Dec. 21, 2009, for U.S. Appl. No. 11/570,411, 21 pp.
Notice of Allowance from U.S. Appl. No. 12/711,892, dated Feb. 2, 2011, 9 pp.
Office Action from U.S. Appl. No. 12/567,266, dated Jun. 20, 2011, 13 pp.
Response to Office Action dated Jun. 20, 2011, from U.S. Appl. No. 12/567,266, filed Sep. 20, 2011, 10 pp.
Office Action from U.S. Appl. No. 12/567,266, dated Feb. 2, 2012, 14 pp.
Office Action from U.S. Appl. No. 12/574,111, dated Nov. 8, 2011, 11 pp.
Response to Office Action dated Nov. 8, 2011, from U.S. Appl. No. 12/574,111, filed Feb. 8, 2012, 9 pp.
Office Action from U.S. Appl. No. 12/130,541, dated Dec. 2, 2011, 9 pp.
Response to Office Action dated Dec. 2, 2011, from U.S. Appl. No. 12/130,541, filed Feb. 1, 2012, 13 pp.
Office Action from U.S. Appl. No. 12/331,060, dated Oct. 13, 2011, 12 pp.
Response to Office Action dated Oct. 13, 2011, from U.S. Appl. No. 12/331,060, filed Jan. 13, 2012, 10 pp.
Response to Office Action dated Feb. 2, 2012, from U.S. Appl. No. 12/567,266, filed May 2, 2012, 5 pp.

* cited by examiner

INTERCHANGEABLE LOAD CELL ASSEMBLIES

TECHNICAL FIELD

The disclosure relates generally to dispensers and more particularly to dispensing a product based on mass.

BACKGROUND

Dispensers may be used to dispense any type of product, such as a chemical product, a cleaning product, a food or beverage product, and so forth. The product may be dispensed from via any suitable technique. For example, in one type of dispenser, a diluent is used to erode and/or dissolve a product, such as a detergent, in order to dispense a portion of the product from the container. The product being dispensed may be a solid product in the form of either a solid block of chemical, pellets or a cast product. Such a dispenser may include a spray nozzle for directing a uniform dissolving spray on to a surface of a solid block of cleaning composition. The nozzle directs a liquid at an exposed surface of the solid block to dissolve and/or erode a portion of the block and forming a product concentrate (also known as a "use solution").

In certain applications it may be desirable to determine the amount of product dispensed and/or the amount of product remaining. One type of system that allows determination of the amount of product dispensed and/or the amount of product remaining is a mass-based dispensing system. Examples of mass-based dispensing systems are shown and described in co-pending and commonly assigned U.S. patent applications Ser. No. 10/437,257, entitled "Method and Apparatus for Mass Based Dispensing," filed May 12, 2003 to Richard J. Mehus, et al; Ser. No. 10/436,454, entitled "Methods of Dispensing," filed May 12, 2003, to Richard J. Mehus, et al; Ser. No. 10/843,219, entitled "Method and Apparatus for Mass Based Dispensing," filed May 12, 2004 to Richard J. Mehus, et al; and Ser. No. 10/843,230, entitled "Method and Apparatus for Mass Based Dispensing," filed May 11, 2004, to Richard J. Mehus, et al., all of which are incorporated herein by reference in their entirety.

SUMMARY

In general, the disclosure relates to a mass-based dispensing system having a set of interchangeable load cell assemblies. The load cell assemblies are sized to be interchangeably received into a product dispenser. For example, the interchangeable load cell assemblies may be substantially modular (i.e., have substantially similar external geometries), thus enabling the product dispenser to interchangeably receive the load cell assemblies.

Each of the interchangeable load cell assemblies has a maximum rated load that is different from the maximum rated load of the other load cell assemblies. A particular load cell assembly may be selected from the set of interchangeable load cell assemblies based on the initial weight of the product to be dispensed. Upon selecting a product to be dispensed, an operator may select a load cell assembly from the set of load cell assemblies to incorporate into the product dispenser, where the selected load cell assembly has a maximum rated load that is appropriate for the initial weight of the product to be dispensed.

As the product is dispensed, the selected load cell assembly obtains product weight information before, during and/or after each dispensing cycle. The product weight information may be used to determine, for example, the amount of product that has been dispensed and/or the amount of product remaining.

If a product having a sufficiently different weight is to be later dispensed using the same dispenser, a different one of the set of interchangeable load cell assemblies may be chosen and positioned within the dispenser. Accordingly, the interchangeable load cell assemblies enable a single product dispenser to accommodate a broad range of differently weighted products.

In one embodiment, the invention is directed to a system comprising a dispenser that dispenses a product based on a measured weight of the product, and a set of load cell assemblies each having a different maximum rated load and sized to be interchangeably received into the dispenser to accommodate the dispensing of products having different initial weights, wherein each load cell assembly includes at least one load cell that measures the weight of the product when the load cell assembly is positioned in the dispenser.

In another embodiment, the invention is directed to a system comprising a set of load cell assemblies each having a different maximum rated load, wherein the load cell assemblies are sized to be interchangeably received into a dispenser that dispenses a product based on a measured weight of the product, and wherein the load cell assemblies measure the weight of the product when received into the dispenser.

In another embodiment, the invention is directed to a system comprising a first load cell assembly having a first maximum rated load, and a second load cell assembly having a second maximum rated load, the first and second load cell assemblies sized to be interchangeably received into a dispenser that dispenses a product based on a measured weight of the product, and wherein the first and second load cell assembly determine the measured weight of the product when received into the dispenser.

The details of one or more embodiments of the invention are set forth in the accompanying drawings and the description below. Other features of the invention will be apparent from the description and drawings, and from the claims.

DETAILED DESCRIPTION

Figure 1:
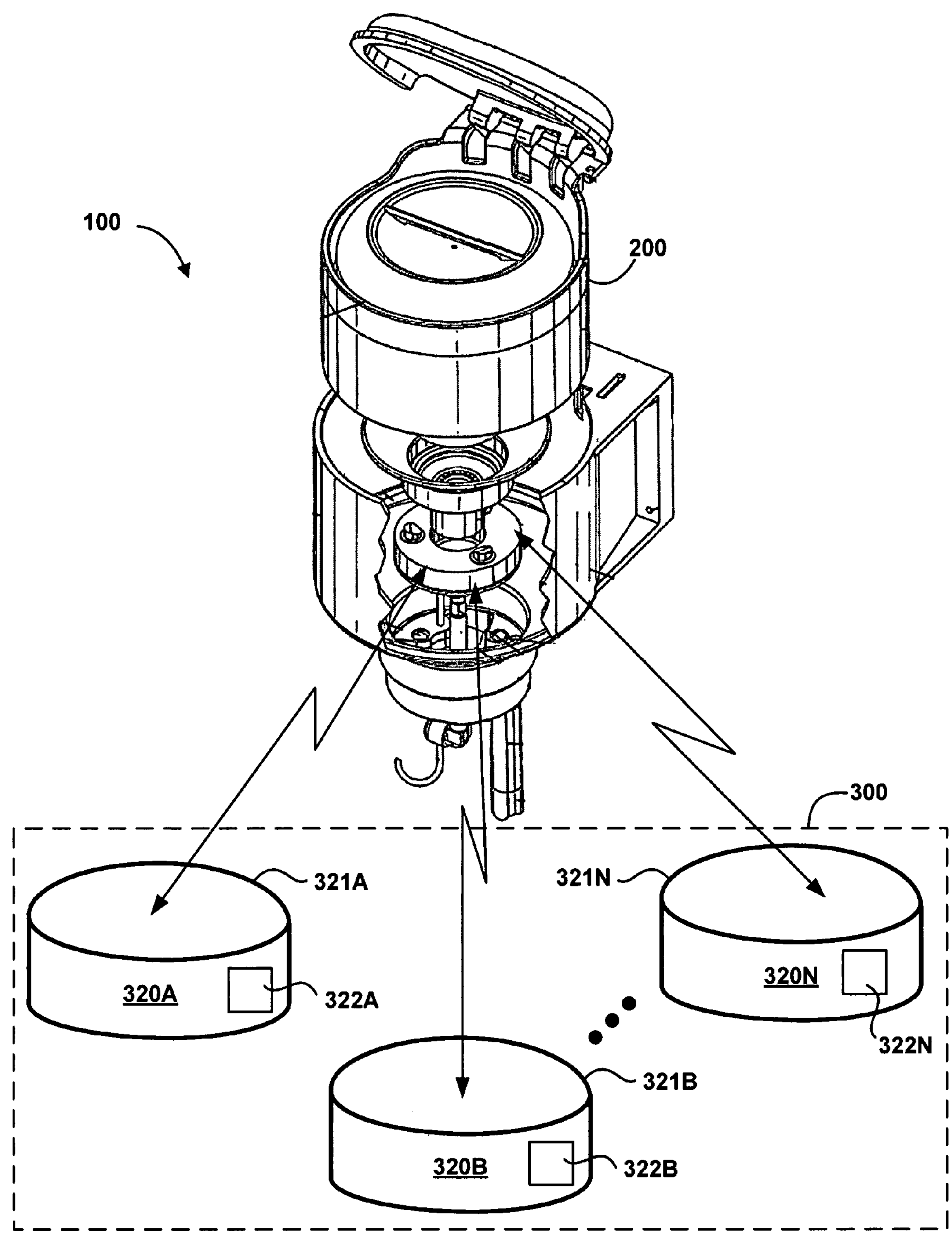
FIG. 1 is a conceptual diagram of a dispenser system in accordance with the invention, which includes a set of interchangeable load cell assemblies.

FIG. 1 is a conceptual diagram of a mass-based dispenser system 100 having a set 300 of interchangeable load cell assemblies 320A-320N. Each of load cell assemblies 320A-320N includes a housing 321A-321N, respectively, sized to be interchangeably received into dispenser 200. Housings 321A-321N may be made of molded plastic or other suitable material. Each of load cell assemblies 320A-320N also includes at least one load cell comprised of a load beam, strain gauge and associated control electronics (not shown in FIG. 1). Product weight information obtained by the load cells before, during and/or after a dispensing cycle may be used to determine, for example, the amount of product that has been dispensed and/or the amount of product remaining.

In certain cleaning environments, such as institutional laundry, warewashing or formulation facilities, dispenser 200 may be called upon to dispense a variety of different products. Many of these products will be differently weighted. That is, many of the products to be dispensed will have widely varying initial weights (i.e., the weight of either the product itself when brand-new or the combined weight of the product and any product container when brand-new or full). At the same time, the load cells used to determine the weight of the products and/or the amount of product dispensed are typically designed for weight ranges that are not sufficiently broad to encompass the wide variety of differently weighted products that may be faced by a product dispenser 200.

To accommodate a broad range of differently weighted products that may be faced by a product dispenser, each of the interchangeable load cell assemblies 320A-320N has a maximum rated load that is different from the maximum rated load of the other load cell assemblies. A particular load cell assembly may be selected from the set of interchangeable load cell assemblies 320A-320N based on the desired maximum rated load for the load cell assembly. That is, upon selecting a product to be dispensed, an operator may select a load cell assembly from the set of load cell assemblies 320A-320N having a maximum rated load that is appropriate for the initial weight of the selected product. Accordingly, the interchangeable load cell assemblies enable a single product dispenser 200 to accommodate a broad range of differently weighted products.

As stated above, load cell assemblies 320A-320N are sized to be interchangeably received into a mass-based product dispenser 200. For example, interchangeable load cell assemblies 320A-320N may be substantially modular (i.e., have substantially similar external geometries), thus enabling the product dispenser 200 to interchangeably receive load cell assemblies 320A-320N. In other embodiments, interchangeable load cell assemblies 320A-320N need not have substantially similar external geometries, but rather are sized to ensure interchangeable receipt into mass-based dispenser 200. The set 300 of load cell assemblies 320A-320N may also be configured to be integrated into more than one type of dispenser 200.

The set of interchangeable load cell assemblies 320A-320N may include any arbitrary number of load cell assemblies, depending upon the expected number of different products and the initial weight of those products to be dispensed by dispenser 200. Load cell assemblies 320A-320N may be of the type and shape shown in FIGS. 5-9, of the type and shape shown in FIGS. 15-16, or any other type or shape of load cell assembly. Although in FIG. 1 interchangeable load cell assemblies 320A-320N are represented in a generally cylindrical shape, it shall be understood that load cell assemblies 320A-320N may take any shape without departing from the scope of the present invention. The load cell assemblies 320A-320N need only be shaped to fit within the dispenser 200.

In some embodiments, to ensure that load cell assemblies 320A-320N may be interchangeably received into dispenser 200, load cell assemblies 320A-320N have substantially similar external geometries. That is, the various external dimensions of load cell assemblies 320A-320N are substantially similar. The external dimensions may include length, width, height, diameter or other relevant dimension, depending upon the shape of the load cell assemblies. This ensures a proper fit of each of load cell assemblies 320A-320N within the dispenser 200. Load cell assemblies 320A-320N are each configured to be integrated, both mechanically and electrically, into the dispenser 200 or any other suitable dispenser or device that requires a substantially accurate and precise device for measuring weight.

To accommodate a variety of differently weighted product containers, load cell assemblies 320A-320N have different maximum rated loads while maintaining the substantially similar external geometries. For example, in one embodiment, load cell assembly 320A may have a maximum rated load of about 1 kilogram (kg), load cell assembly 320B may have a maximum rated load of about 10 kg and load cell assembly 320N may have a maximum rated load of about 50 kg, etc. The aforementioned rated loads are merely exemplary and in other embodiments, the load cell assemblies 320A-320N may have any suitable rated load, which may depend upon the particular product or group of products to be dispensed and the initial weight of those products. In addition, the set of interchangeable load cell assemblies 320A-320N may include any suitable number of load cell assemblies, such as two or more than three. Again, the number of load cell assemblies 320A-320N may depend, among other things, on the type and/or initial weight of products to be dispensed.

In addition to having substantially similar external geometries, load cell assemblies 320A-320N also have substantially similarly sized receiving areas for their respective load cells. This helps to ensure that the external geometries of the load cell assemblies 320A-320N remain substantially similar. Thus, in FIG. 4, for example, receiving areas 266, 268 and 170 all have substantially similar dimensions. In other embodiments, such as FIG. 10, for example, the dimensions of the receiving areas for a similarly designed set of interchangeable load cell assemblies 320A-320N would likewise be substantially similar.

To accommodate different maximum rated loads for each of the load cell assemblies 320A-320N, each load cell assembly 320A-320N includes a load cell or cells having a maximum rated load that is different from the maximum rated load of the load cell or cells of the other load cell assemblies 320A-320N. The load cells within each of load cell assemblies 320A-320N are designed with load beams that, while rated for different maximum loads, have substantially similar deflections at 100 percent (%) of their respective rated load. This is described in further detail in reference to FIGS. 9A-9C and 9A-9C. In this way, a single type of housing 321 can be used to produce a set of interchangeable load cell assemblies, each having a different maximum rated load. This in turn accommodates dispensing of a variety of differently weighted products and/or products in differently weighted product containers by a single dispenser.

The load cell or cells of a product dispenser are typically rated to be used with a particular maximum load. In a dispenser having multiple load cells, each load cell has the same maximum rating, which when combined result in a particular maximum rated load of the load cell assembly as a whole. To prevent failure of the load cells, the maximum rated load of the load cells and thus the load cell assembly is typically selected to accommodate the initial weight of a particular product to be dispensed by the dispenser 200.

Dispenser system 100 enables an operator to switch from one load cell range to another as the load requirements of dispenser 200 change without having to purchase or use a different type of dispenser 200. Rather, the operator need only substitute one load cell assembly for another load cell assembly having the suitable maximum rated load matched to the product to be dispensed. The interchangeability of the load cell assemblies 320A-320N broadens the range of applications for which dispenser 200 is useful. The interchangeable load cell assemblies 320A-320N also reduce manufacturing costs as differently sized or shaped dispensers and/or load cell housings need not be manufactured to accommodate the differently weighted products that may be faced in different dispensing applications. Rather, only a single type of dispenser 200 and a single type of housing 300 need be manufactured, installing differently rated load cells among a set of load cell assemblies having a common external geometry to accommodate an expected range of differently weighted product containers.

In other embodiments, the set 300 of load cell assemblies 320A-320N may form a system in and of themselves, without the dispenser 200. In this way, a set of load cell assemblies may be kept on hand at each dispensing site to adapt each dispensing system 100 to the appropriate maximum rated load as the need arises.

In order to distinguish between load cell assemblies 320A-320N, and in particular, the rated load for each of load cell assemblies 320A-320N, load cell assemblies 320A-320N may each include a visible marker 322A-322N, respectively. Visible markers 322A-322N may be, for example, a color-coded and/or printed text emblem (e.g., a sticker), a printed marking, an embedded marker (e.g., an indentation) in the load cell assembly 320A-320N, another type of marker that is visible or otherwise detectable by an operator (i.e., a user) of dispenser system 100 or any combination of the same. It shall be understood that the relative size of visible markers 322A-322N shown in FIG. 1 is merely one example size and that in other embodiments visible markers 322A-322N may be any suitable size. In embodiments in which the maximum rated load is color coded (such as yellow for 1 kg, blue for 10 kg, red for 20 kg, and green for 50 kg, for example) visible markers 322A-322N may alternatively encompass all or part of housings 321A-321N themselves, so that each housing 321A-321N is formed in whole or in part from a different color material. Thus, it shall be understood that any manner of communicating the rated load of the interchangeable load cell housings 320A-320N is contemplated herein, and that the invention is not limited in this respect.

A general description of the example mass-based dispenser 200 will now be given. More detailed descriptions of example mass-based dispensing systems can be found in the aforementioned co-pending and commonly assigned U.S. patent applications Ser. No. 10/437,257, entitled "Method and Apparatus for Mass Based Dispensing," filed May 12, 2003 to Richard J. Mehus, et al; Ser. No. 10/436,454, entitled "Methods of Dispensing," filed May 12, 2003, to Richard J. Mehus, et al; Ser. No. 10/843,219, entitled "Method and Apparatus for Mass Based Dispensing," filed May 12, 2004 to Richard J. Mehus, et al; and Ser. No. 10/843,230, entitled "Method and Apparatus for Mass Based Dispensing," filed May 11, 2004, to Richard J. Mehus, et al., all of which are incorporated herein by reference in their entirety.

Figure 2:
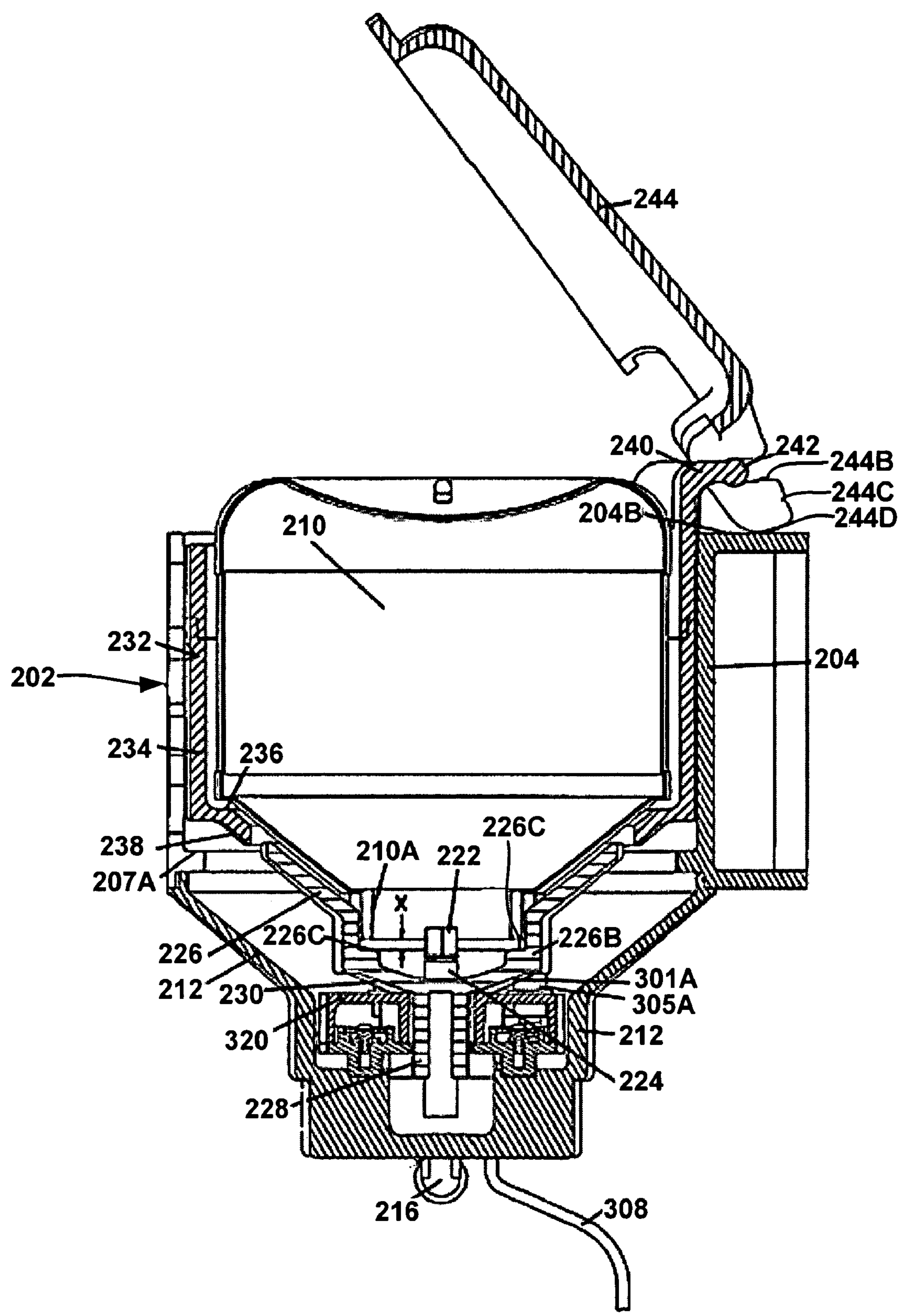
FIG. 2 is a cross-sectional view of the dispenser show in FIG. 1.
Figure 3:
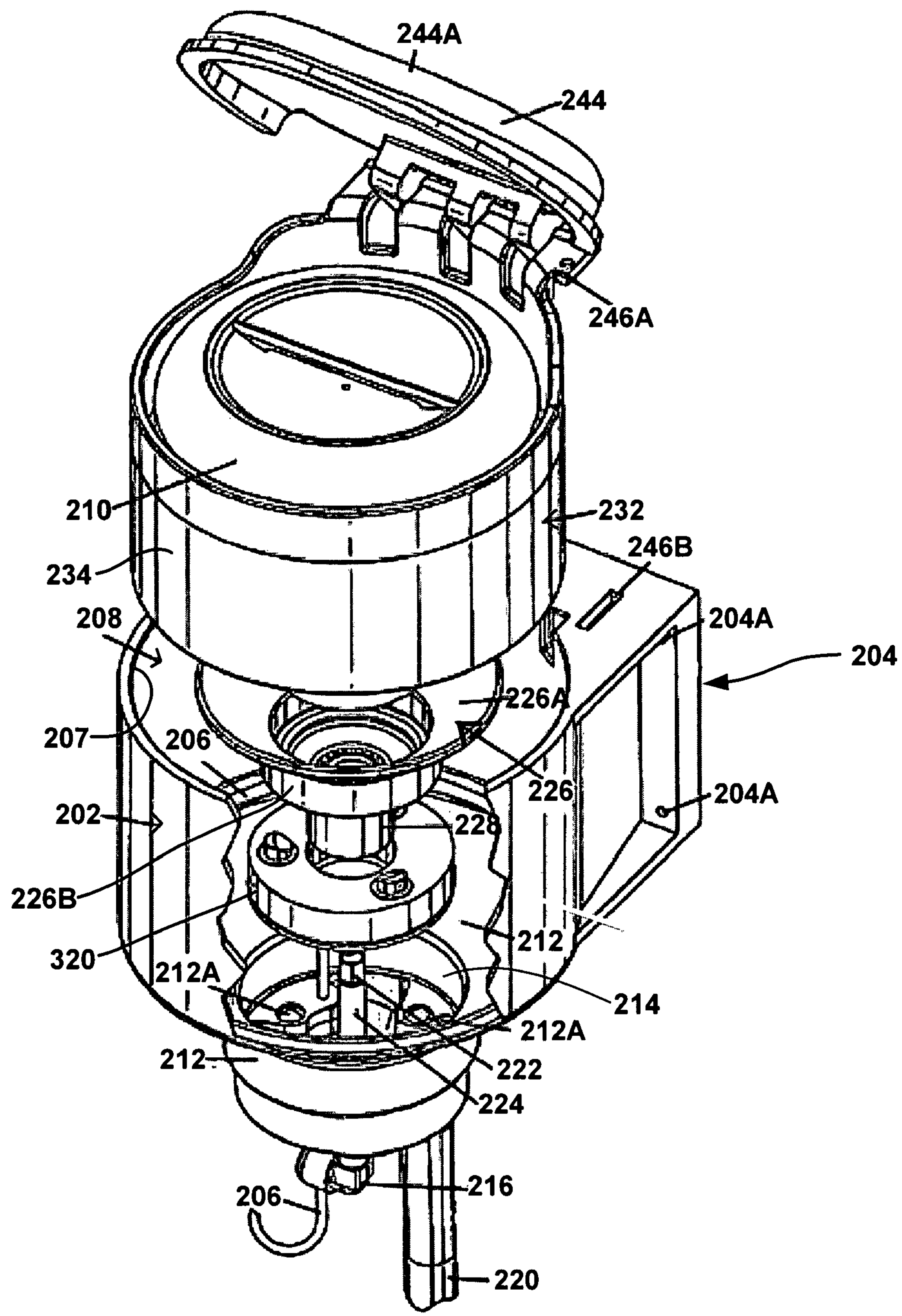
FIG. 3 is an exploded perspective view of the dispenser shown in FIG. 1.

FIG. 2 is a cross-sectional view of the example dispenser 200 of FIG. 1, and FIG. 3 is an exploded perspective view of the dispenser 200 of FIG. 1. In the embodiment shown in FIGS. 2 and 3, a dispenser housing 202 having a cover 244 is shaped to receive a product container or capsule 210. Product container 210 may be any suitable container for a product, and need not be in a capsule shape. For example, in other embodiments, the dispenser 200 may be configured to support and dispense a product from any suitable size container, such as a bottle, pouch, reservoir or other suitable product container. In addition to or instead of receiving different sized product containers or capsules 210, the cylindrical section 206 may be designed to accept briquettes, powders or blocks of product that are not inside of a container.

Mass-based dispenser 200 dispenses a product by spraying a diluent onto the product to erode and/or dissolve the product, thus creating a use solution. Accordingly, dispenser 200 includes an inlet conduit 216, which is in fluidic communication with capsule 210 and an outlet conduit 220. In the example dispenser shown in FIGS. 2 and 3, a nozzle 222 receives diluent from inlet conduit 216 and sprays the diluent in a generally upward direction to erode and/or dissolve the product. In other embodiments, nozzle 222 may be placed to introduce the diluent at other locations with respect to the product, such as spraying down from above or from the side. The erosion and/or dissolving may be by spray or by flooding. The product may also be ground away or drilled out by mechanical action. It shall be understood, therefore, that there are a number of ways to erode and/or dissolve the product. It is also understood that the mass-based dispensing system described herein may be utilized to dispense a product that does not have to be eroded or dissolved for the product to be dispensed.

Dispenser 200 may be mounted on a suitable mounting surface (not shown) using mounting section 204. Alternatively, dispenser 200 may be a free-standing. An electrical cord 308 may be used to provide power to the dispenser 200. Alternatively, dispenser 200 may be powered by a battery or other suitable power source.

An inner wall 207 of housing 202 defines a cavity 208. The cavity 208 is sized to accommodate the capsule 210 which contains a product to be dispensed by dispenser 200. Inner wall 207 defines a circular rim 207A formed around its bottom portion.

To protect the load cell assembly 218 from extreme shock attributable to dropping the capsule 210 directly on the load cell assembly 218, the dispenser 200 may utilize a moveable capsule or container holder 232. The container holder 232 includes a cylindrical wall portion 234 and a circular rim 236 extending from the cylindrical wall portion 234. The container holder 232 further includes a tapered section 238 that extends down from the rim 236. The cylindrical wall portion 234 is sized and configured to fit inside of the cavity 208 of the dispenser housing 202 so that the capsule 210 may effectively be moved up and down within the cavity 208. At the top and back of the cylindrical wall portion 234 is formed a cover mounting member 240. The cover mounting member 240 terminates in a cylindrical portion 242 that is utilized to pivotally connect a cover 244. The cover 244 has a lid portion 244A that is sized and configured to cover the capsule 210. A slot 244B is sized and configured to receive the cylindrical portion 242 of the container holder 232 to provide a snap fit between the cover 244 and the product holder 232. The cover 244 has an extension 244C on which a cam 244D is formed. The cam 244D acts on a cam surface 204B which is the top of the mounting section 204.

When the cover 244 is raised, as shown in FIG. 2, the cover mounting member 244D is carried to the upper position, which necessarily raises the entire container holder 232. When the container holder 232 is raised, the capsule 210 is also raised because the capsule 210 rests on rim 244B. The arrangement between capsule 210 and rim 244B of cover 244 provides a distance X between the lip (or rim) 226C of cylindrical section 226B of product holder 226 and the neck 210A of capsule 210. Therefore, if a capsule 210 was loaded by simply dropping or forcing it into the dispenser 200, the force would not be absorbed by the product holder 226, but would instead be absorbed by the container holder 232, the tapered section 238 of the container holder 232 and the circular rim 236 of the container holder 232. When lowered, the cam 244D, along with a pivoting section of the cover 244 will cause the cover mounting member 240 to be lowered as the distance the slot 244B is above the cam surface 244D is less, which in turn will allow the capsule 210 to be supported on the product holder 226. This in turn allows the concentrate inside of the capsule 210 to be weighed by the load cell assemblies 320.

A product holder 226 has a funnel section 226A and a cylindrical section 226B. The funnel section 226A is sized and configured to match the outer shape of the neck 210A of the capsule 210. The cylindrical section 226B has a lip or rim 226C formed therein, which provides a surface on which the neck 210A of the capsule 210 rests. In addition, the product holder 226 includes a second cylindrical section 228 that is operatively connected to a second funnel section 230 and extends down around the pipe 224. The second funnel section 230 is operatively connected to the first cylindrical section 226B. Second funnel section 230 rests on a selected one (designated generally by reference numeral 320) of the set of interchangeable load cell assemblies 320A-320N, as will be described more fully hereafter.

A sump section 212 is operatively connected to the bottom of the housing 202 and provides for a collection region for the use solution that results from diluting, eroding, dissolving or otherwise releasing the product concentrate within capsule 210. The sump section 212 has an inlet 214. The inlet 214 is formed in the bottom of the sump section 212 proximate to a center of the sump section 212 and provides for an entrance for the inlet conduit 216 that provides for fluid communication of the diluent into the cavity 208. The sump section 212 has three indentations 212A formed in the bottom of the sump section 212. Only two of the indentations 212A are shown in FIG. 3, the third being hidden from view. In the embodiment shown in FIG. 3, the three indentations 212A are spaced about 120 degrees from each other and are sized and configured to receive and support the load cell assembly 218, as will be described in further detail below. In other embodiments, the indentations 212A may have another suitable arrangement with respect to each other (i.e., unevenly spaced).

To dispense the product and form a use solution, a fluid (e.g., a diluent) may be introduced into the capsule 210 to erode and/or dissolve the product concentrate. In order to introduce the fluid into the capsule 210, dispenser 200 includes a spray nozzle 222, which is in fluid communication with a pipe 224 that is fluidically connected to the inlet 216. The pipe 224 may be molded as a portion of the sump section 212. An outlet 220 provides a channel for the use solution formed by the diluent and the concentrate within the capsule 210 to flow out of the dispenser 200.

During operation of dispenser 200, the product capsule 210 is positioned on the product holder 226, which is in turn carried by the load cell assembly 320. Therefore, the weight of the capsule 210 and the product holder 226 is weighed by the load cell assembly 320. The load cell assembly 320 may measure the weight of the capsule 210 before, during and/or after a dispensing cycle of the product dispenser 200 to determine how much product has been dispensed and/or how much product is remaining within the capsule 210.

Figure 4:
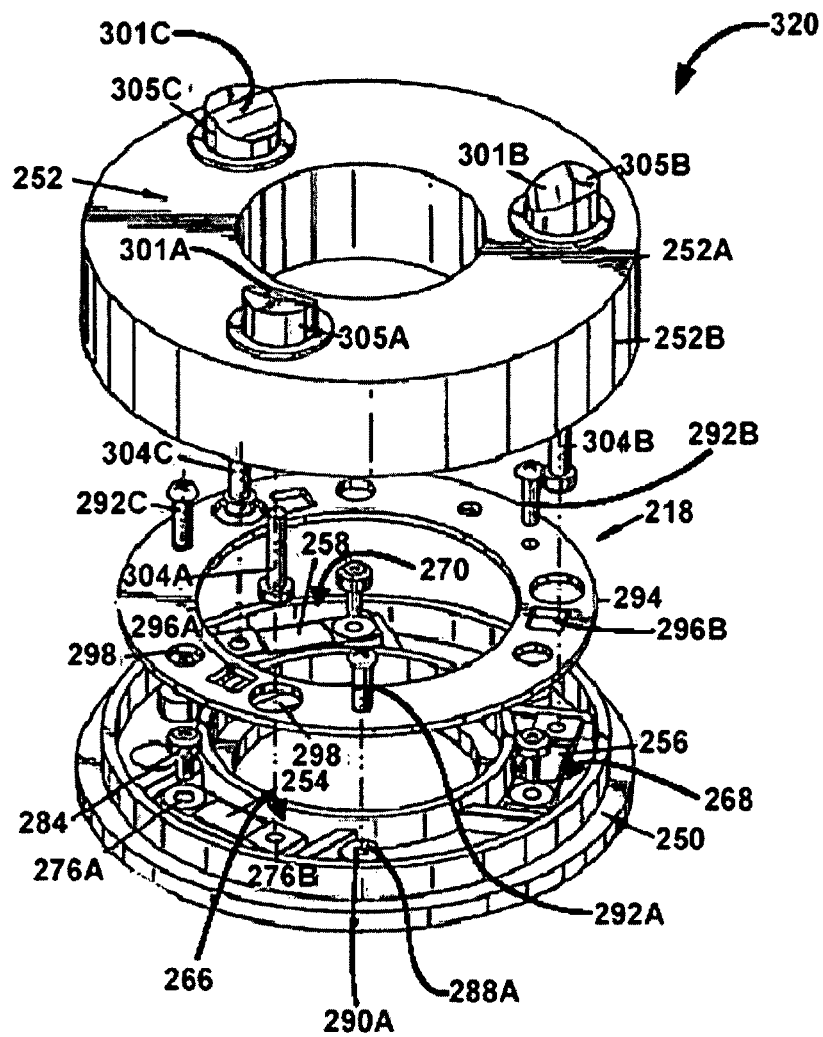
FIG. 4 is an exploded perspective view of a load cell assembly shown in FIG. 2.
Figure 5:
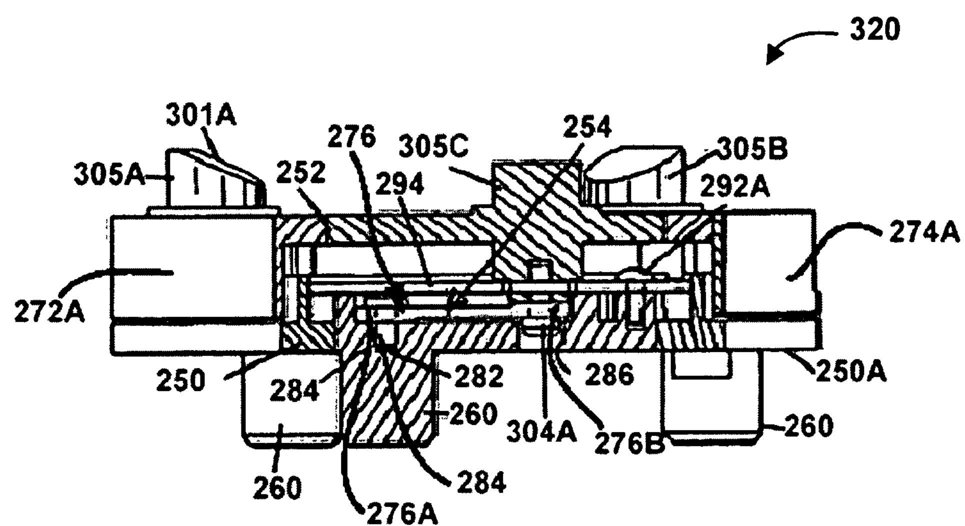
FIG. 5 is a schematic cross-sectional view of a portion of a top housing portion and a bottom housing portion of the load cell assembly shown in FIG. 4.

FIGS. 4 and 5 illustrate views of an example load cell assembly 320 of dispenser 200. FIG. 4 illustrates an exploded perspective view of the load cell assembly 320, and FIG. 5 illustrates a schematic cross-sectional view of load cell assembly 320. In the example embodiment shown in FIGS. 4 and 5, load cell assembly 320 includes three load cells 253, 255 and 257. In other embodiments, load cell assembly 320 may include one, two or more than three load cells.

Load cell assembly 320 has a generally annular shape (i.e., a ring shape) and includes a bottom housing portion 250, a top housing portion 252 and load cells 253, 255 and 257. Each load cell 253, 255 and 257 includes a load beam 276, 278 and 280 and a strain gauge 254, 256 and 258. Multiple load cells 253, 255, and 257 enable an averaging of the output of their respective load beams, which may help develop better resolution and a more accurate and precise measurement of weight of capsule 210 than with a single load cell. Strain gauges 254, 256 and 258 are suitably mounted on their respective load beam or base member 276, 278 and 280, which each have a generally rectangular shape in this example.

In the example embodiment, three protrusions 260 extend from the bottom 250A of the bottom housing portion 250. The protrusions 260 are spaced about 120 degrees from each other and are sized and configured to rest in the indentations 212A defined by sump section 212 (FIGS. 2 and 3) of the dispenser housing 202. The bottom housing portion 250 includes a circular wall 262 that defines a ledge 262A. The wall 262 and ledge 262A form a structure for receiving the top housing portion 252. An inner wall 264 of bottom housing portion 250 is spaced from the circular wall 262 and forms a ring in which the three load cells 253, 255, and 257 are positioned. In particular, the load cells 253, 255 and 257 are disposed in respective receiving areas 266, 268 and 270. Dividing members 272A and 274A define receiving area 266, while dividing members 272B and 274B define receiving area 268 and dividing members 272C and 274C define receiving area 270.

Each load beam 276, 278 and 280 also defines a second opening 276B, 278B and 280B, respectively, on an opposite end of the load beam 276, 278 and 280 from the respective first opening 276A, 278A and 280A. The second openings 276B, 278B and 280B are each above a bore 282 (one of which is shown in FIG. 5) in the bottom housing portion 250. Receiving areas 266 and 270 also include similar second bores 286. The bores 282 are configured to receive a bolt (e.g., bolt 304A shown in FIG. 5) to couple the second end 276B, 278B and 280B of each load beam 276, 278 and 280 to the bottom housing portion 250.

In some embodiments, at least one of the load cell receiving areas may be configured to limit torsional rotation of its respective load beam. For example, a load cell receiving area may be configured such that the length of the respective load beam is substantially the same length as the length of the respective receiving area. This may help prevent torsion from affecting the output of the strain gauge. For example, when load beam 276 to which strain gauge 254 is mounted is received in receiving area 266, and when load beam receiving area is configured to limit torsional rotation of load beam 276 by having a substantially similar length to the load beam 276, the load beam 276 may be discouraged from twisting. In other embodiments, the load cell receiving area and the load beam may be fabricated to include mating portions which hold the beam in place in its proper position within the receiving area and thus help to prevent twisting. It shall be understood that other mechanisms for preventing twisting of the load beam(s) may also be employed and that the invention is not limited with respect to the precise manner of prevent twisting.

Each strain gauge 254, 256 and 258 and respective load beam 276, 278 and 280 define a load cell 253, 255 and 257, respectively, for determining a weight of a product capsule 210 when capsule 210 is introduced into dispenser housing 202. Each load beam 276, 278 and 280 has a first end 276A, 278A and 280A, and second end 276B, 278B and 280B opposite the first end, where the second end has a clearance greater than the first end with respect to the bottom housing portion 250. The second end of the load beam 276B proximate to the wall 272A is considered the "free" end of the load cell. The second end 276B has slightly more clearance than the first end 276A with respect to the bottom housing portion 250 in order to allow for the movement up and down of the free end 276B of the load beam 276. Also, with the first end 276A secured to the bottom housing portion 250, the first end 276A is the dominant end for protection from twisting of the load cell (i.e., the strain gauge 254 and load beam 276).

Three standoffs 288A-C, which define respective openings 290A-C, are also connected to the bottom housing portion 250 and spaced at intervals of about 120 degrees. Standoffs 288A-C are configured to receive respective bolts 292A-C that connect printed circuit board 294 to bottom housing portion 250, as shown with respect to standoff 288A and bolt 292A in FIG. 4. The printed circuit board 294 may include a controller, a memory and other appropriate electronic circuit components. Each strain gauge 254, 256 and 258 is electrically connected to the printed circuit board 294, so that the controller receives product weight information from each of the load cells 254, 256 and 258.

As shown in FIG. 4, the top housing portion 252 of load cell assembly 218 has a generally planar top surface 252A with a cylindrical side wall 252B. The side wall 252B is sized and configured to fit around the circular wall 262 of bottom housing portion 250 and the top of the ledge 262A defined by the circular wall 262. Three protrusions 300A-C that extend upward from the top surface 252A of the top housing portion 252. The protrusions 300A-C each has a sloped surface 301A-C, respectively, which is adapted and configured to receive the underside of the cylindrical section 226B of the product holder 226 (shown in FIG. 3).

As previously discussed, a first end of each of the load beams 276, 278 and 280 is secured to the bottom housing portion 250 by a bolt 284. As shown in FIG. 5, the other end of the load beam 276, 278 and 280 is secured by bolt 304A-C, respectively, through opening 276B, 278B and 280A, respectively, to a respective protrusion 305A-C, thereby also securing the moveable end of the load beams 276, 278 and 280 to the top housing portion 252.

Each load beam includes a maximum deflection beyond which the load beam may experience potential damage. This maximum deflection may be expressed in terms of a percentage of the maximum rated load. For example, the maximum deflection for the load beams may be 150 percent of the rated load. The strain response of the example load beams 276, 278 and 280 is linear to weight. If the deflection of a load beam is established for 100 percent of the load, multiplying the deflection value by 1.5 yields a maximum deflection before there is potential damage to the load beams. As such, load cell assemblies 320A-320C may include a stop at this deflection point provides a means to prevent over deflection of the load beam.

Multiple load cells 253, 255 and 257 within the load cell assembly 218 of the dispenser 210 provide multiple weight outputs, which may be averaged to determine a more accurate and precise weight determination of capsule 210 as compared to a single load cell. The multiple load cells 253, 255 and 257 provide sensors for accurate weight measurement under varying load conditions that may result, for example, from detergent tablets within capsule 210 that dissolve unevenly. Multiple load cells may also minimize vibration induced single variations. Also, if one load cell fails, it may be possible to compensate using the two surviving load cells and adjustment algorithms. The load cell assembly 218 may be sealed after assembly to provide environmental protection from surrounding chemistries.

Figure 6:
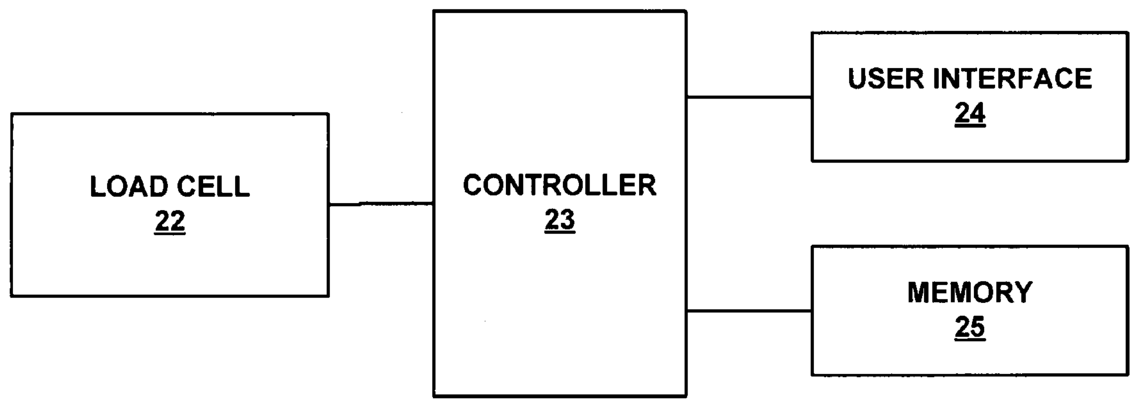
FIG. 6 is a schematic block diagram illustrating the electronics of the dispenser shown in FIG. 1.

FIG. 6 is a block diagram illustrating a load cell (or multiple load cells), indicated generally by reference numeral 22, connected to a controller 23 having an associated user interface 24 and a memory 25. Controller 23 includes a microprocessor and other appropriate hardware and software to process the weight values detected by the load cells. Memory 25 may store a digital data sheet that is programmed by the load cell manufacturer. This data sheet may contain strain gauge calibration data as well as strain gauge service information. The resident data sheet may be accessed by controller 23 for automatic strain gauge configuration.

In use, controller 23 sums the signal outputs of the load cell(s) 22 providing a total weight measurement. Controller 23 may also provide a discrete output from each load cell in the load cell assembly. Discrete outputs from each load cell in the load cell assembly allow for accurate system calibration. This also provides data that may be used to evaluate the uniformity of the product concentrate as it dissolves, such as when a product erodes/dissolves unevenly, resulting in one or more of the load cells supporting a disproportionate amount of weight. Controller 23 may also provide an automatic re-zeroing routine that assures a substantially accurate weight measurement each time a new product is placed in the dispenser 200. An automatic tare function may also be employed so that the weight of the product holder and the empty capsule container are removed from the weight reading.

Figure 7:
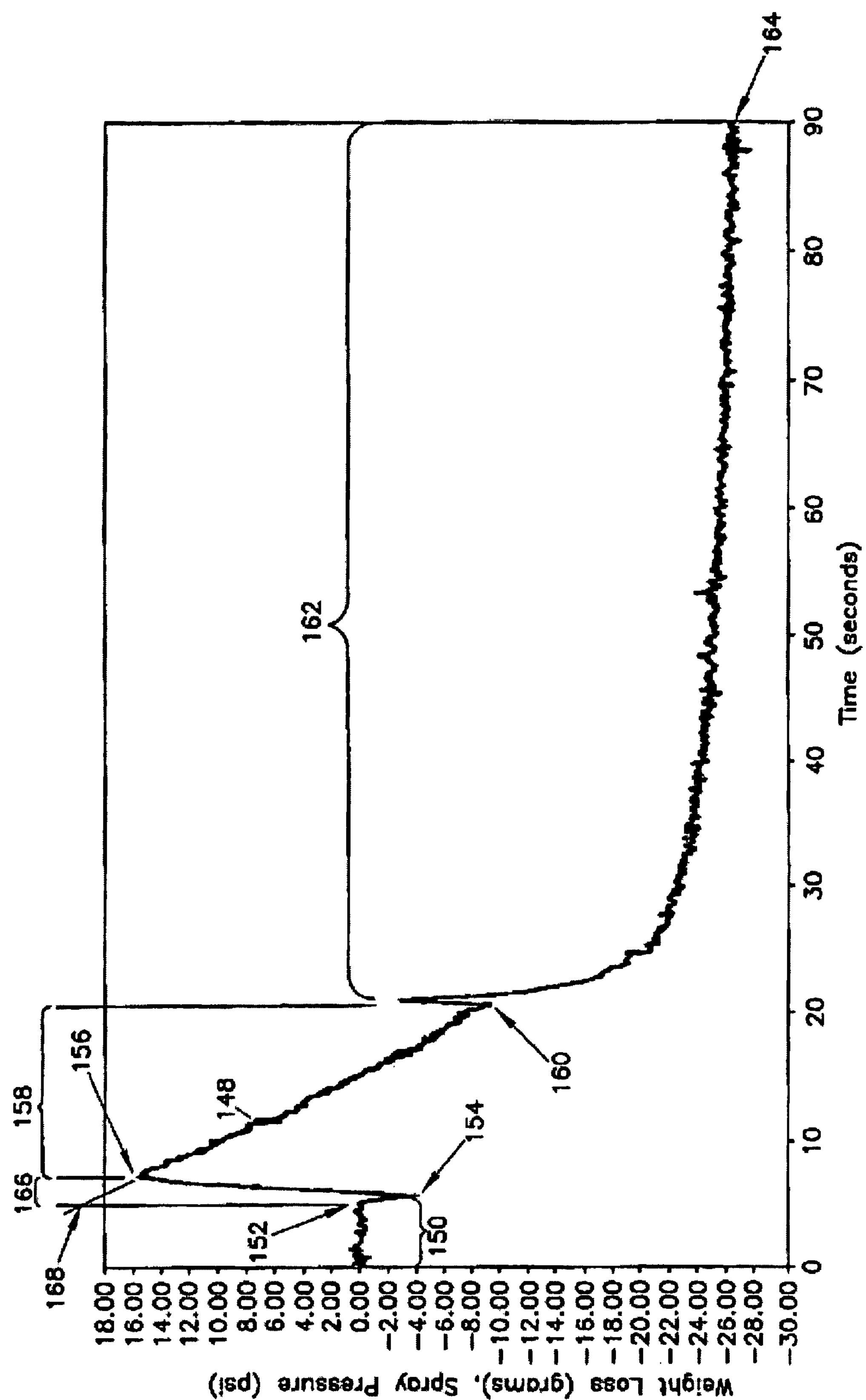
FIG. 7 is a diagram illustrating a weight of a dispensing ingredient of the dispenser of FIG. 1 as a function of time.

FIG. 7 is a graph illustrating the effect of the spray of diluent onto the product in the dispenser 200. The mantissa is time and the ordinate is weight in grams. Time 150 before the initiation of spray represents the starting, or initial, combined weight of the product and product container, netted out at approximately zero (0) grams, for purposes of illustration. Spray is initiated at time 152 at which point two things begin to happen. First, pressure from the diluent sprayed on the underside of the block of solid product relieves some of the combined weight from load cell assembly. Second, the added weight from diluent accumulating in capsule tends to cause an increased combined weight. Thus, the combined weight on load cell assembly initially decreases until time 154 at which point the combined weight reaches an initial minimum of approximately minus four (−4) grams. Following time 154, the added weight of the diluent in capsule causes the combined weight to rather significantly increase. Over time, however, the added weight of the diluent in capsule tends to stabilize as the block of ingredient is eroded. As the solid product is eroded/dissolved, its weight decreases. Thus, at time 156 the combined weight reaches a maximum at approximately sixteen (16) grams. Following time 156 the solid product continues to be eroded/dissolved as the diluent continues to spray. Since the added weight of the diluent in capsule has stabilized, the combined weight continues to decrease during time 158 until the spray is discontinued. The spray of diluent is discontinued at time 160 causing a momentary weight gain for the combined weight as the upward pressure on the solid product is discontinued. Following a momentary weight gain cause by the lack of upward pressure on the solid product by the spray of diluent, diluent continues to drain from capsule during time period 162 resulting in the near final weight at time 164 of approximately minus twenty-six (−26) grams.

The difference between the starting weight at time 150 of approximately zero (0) grams and the ending weight of approximately minus twenty-six (−26) grams, once the diluent has drained from capsule, of twenty-six (26) grams represents the amount of product dispensed. However, note that the difference between the maximum weight of approximately sixteen (16) grams and the weight at time 160 of approximately minus nine (−9) grams when spray is discontinued is only twenty-five (25) grams. This is because product was eroded from the block of ingredient during time 166, between time 152 when spray is begun and time 156 when the maximum is measured, and also during time 162 as diluent drains from capsule.

Figure 8:
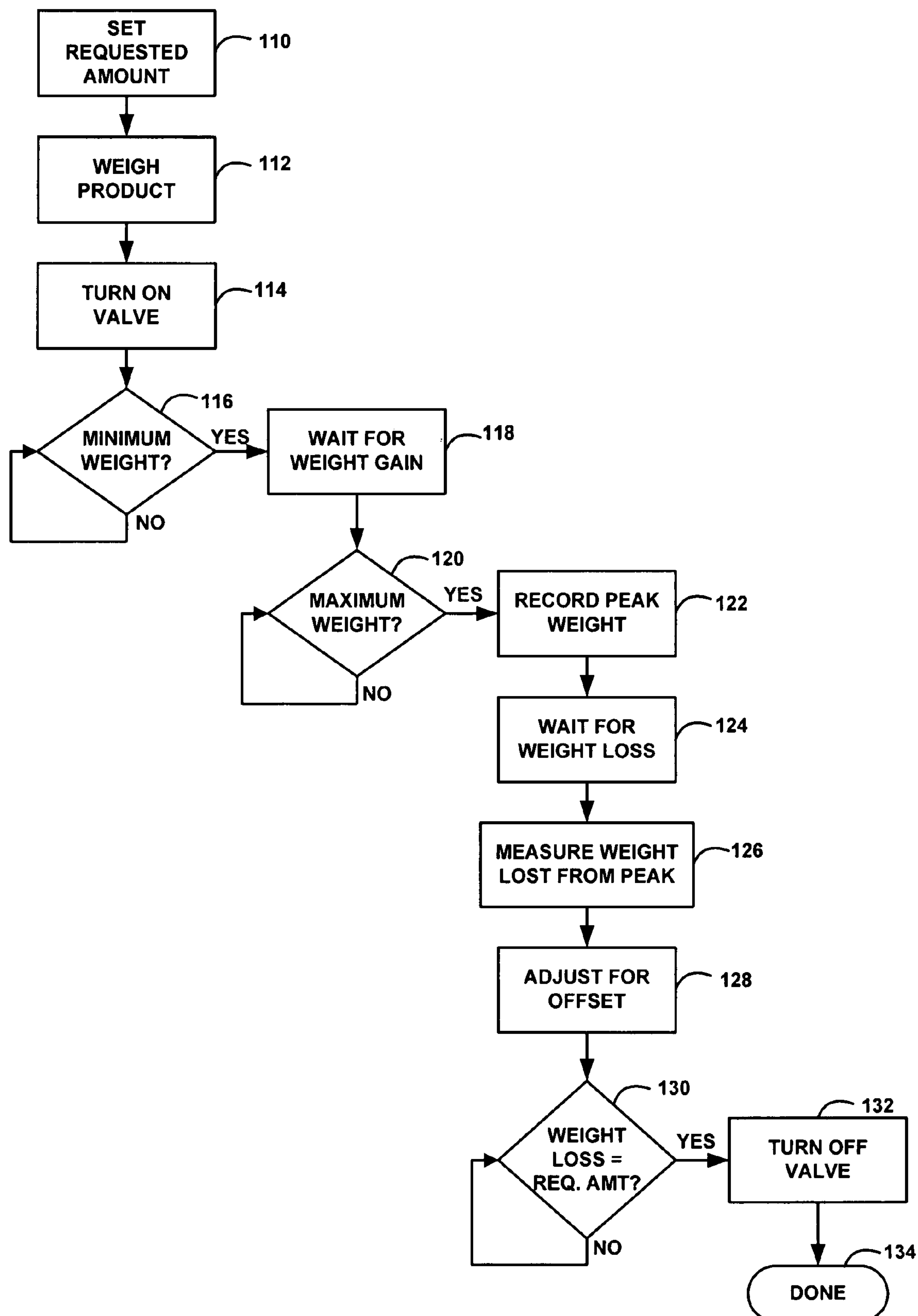
FIG. 8 is a flow diagram illustrating an embodiment of a process for dispensing an ingredient by eroding and/or dissolving the ingredient with a diluent.

FIG. 8 is a flow chart illustrating an example product dispensing process such as that shown in the graph of FIG. 7. A requested amount of the product to be dispensed is set (110). Load cell assembly weighs the product (112). A valve is turned on (114) at time 152 initiating the spray of diluent against the product. Optionally, the process waits (116) for a minimum weight at time 154 to be reached. The process waits (118) for diluent being added by spray to accumulate in capsule and increase the combined weight. Note that if the step represented by block 116 is omitted, it is still proper to wait for weight gain in block 118. Alternatively, if the step represented by block 116 is not omitted then it is no longer necessary to wait for weight gain and the step represented by block 118. Alternatively, the steps represented by both blocks 116 and 118 could be omitted in the process could continue directly to block 120. The method searches for a maximum combined weight at time 156 (120) and, once found, records that peak weight (122). Again optionally, the process waits for weight loss (124). The load cell assembly measures (126) and stores the amount of weight lost from the maximum or peak weight recorded. Optionally, the process adjusts for an offset (128) which is explained below. The process determines (130) whether the measured weight lost is equal to an amount which will result in a dispensed amount of product equaling the requested amount. When such a determination is made, the valve is turned off (132) discontinuing the spray of diluent. The process then stops (134) until the next dispensing cycle.

Since some product will be dissolved and/or eroded from the product concentrate during time 166 (between time 152 when spray is initiated and time 156 when weight loss begins to be recorded) and during time 162 (while remaining diluent drains from capsule 20), the amount of weight lost from the capsule during time 158 does not necessarily equal the total weight of the product dissolved/eroded and, hence, dispensed. However, an amount of the product which is additionally dispensed during time 166 and time 162 can be calculated and/or estimated by a variety of means. For example, this amount can be determined empirically from previous dispensed cycles. Alternatively, the slope of curve 148 during all or a portion of time 158 may be determined and an original maximum 168 may be determined by regression to account for an amount of the product eroded during time 166. The amount of additional product dissolved/eroded during times 166 and 162 can be accounted for in the method in block 128 by adjusting the time 160 at which the spray of the diluent is discontinued. For example, if it is determined that the additional amount of the product dispensed during time periods 166 and 162 is equal to approximately one (1) gram, then time 160 can be adjusted to turn off the spray of diluent when the measured weight loss is equal to the requested amount of product minus one (1) gram.

Figure 9A:
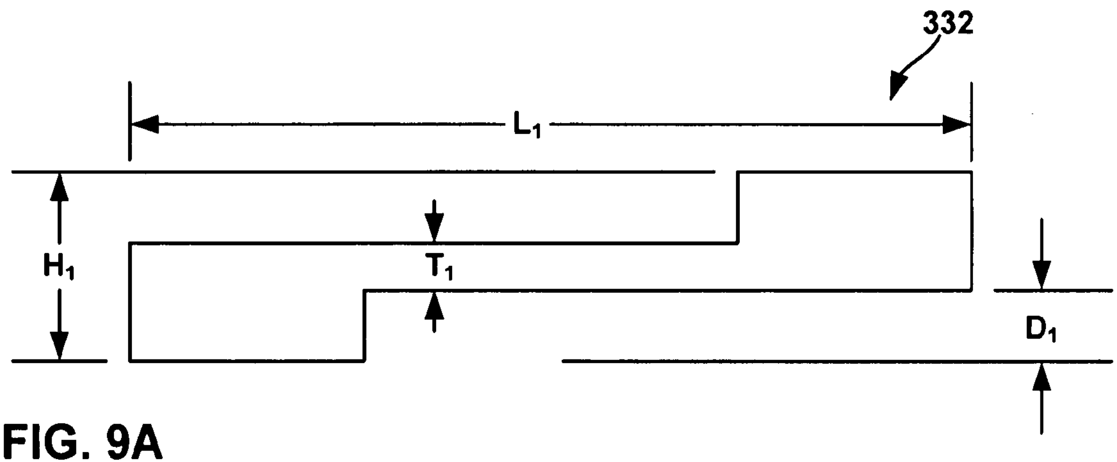
FIGS. 9A-9C are side views of blade-type load cells that have substantially similar dimensions, geometry, and deflection at a maximum rated load, but have different maximum rated loads.
Figure 9B:
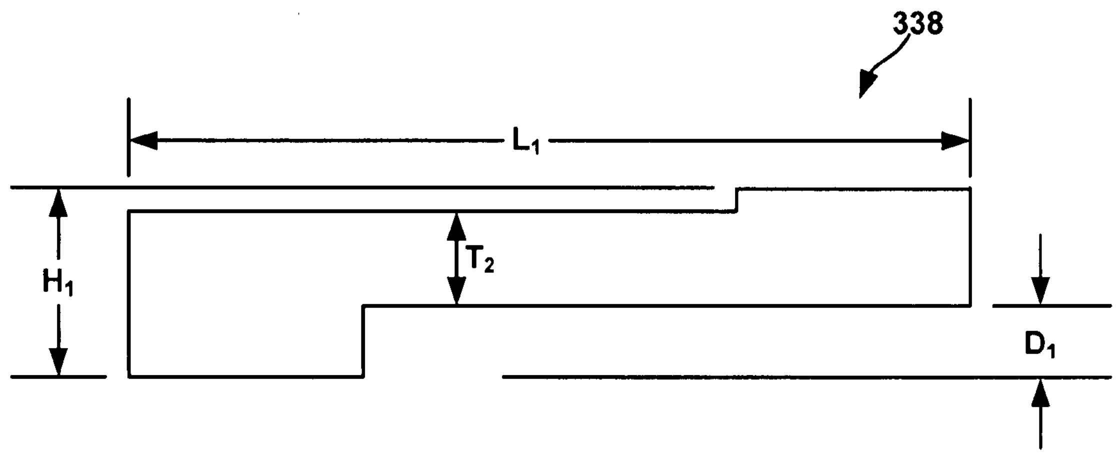
Figure 9C:
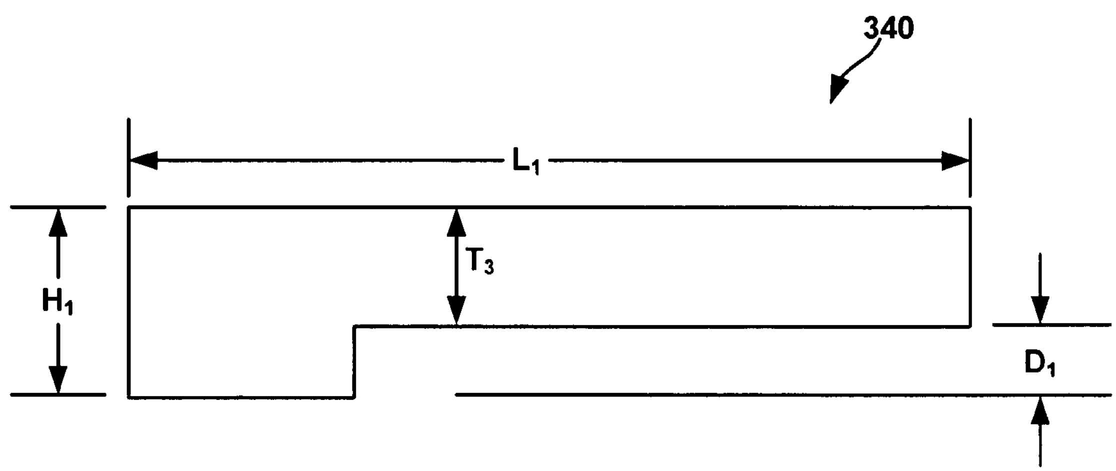

FIGS. 9A-9C are side views of three example blade-type load beams 332, 338 and 340 configured to be interchangeably received into any one of load cell assemblies 320A-320N but having different maximum rated loads. In this example, to allow load beams 332, 338 and 340 to be interchangeably received into any one of load cell assemblies 320A-320N, load beams 332, 338 and 340 have substantially similar external geometries. For example, load beams 332, 338 and 340 each have a substantially similar height $H_1$ and a substantially similar length $L_1$. In addition, load beams 332, 338, and 340 each have substantially similar widths, which are not shown in FIGS. 9A-9C but are measured generally perpendicular to the plane of the image of FIGS. 9A-9C. In addition, load beams 332, 338 and 340 are configured to have a substantially similar deflection $D_1$ at 100% of their respective maximum rated loads.

Load beams 332, 338 and 340 may be configured to have substantially similar "stop deflections." The so-called stop deflection, $D_s$ (not shown in FIGS. 9A-9C) is the amount of deflection at a percentage of their respective maximum rated loads at which a physical stop is placed to prevent overdeflection of load beams 352, 364 and 366. This may be set at any appropriate percentage of the maximum rated load, as long as the resulting deflection is less than that at which damage to the load beam would occur. For example, if load beam damage would occur when the weight borne by the load beam is 200% of the maximum rated load, the stop deflection may be set anywhere between 100% of the maximum rated load and 200% of the maximum rated load, such as 125%, 150%, or 175% of the maximum rated load.

One way to provide a set of load beams having different maximum rated loads while maintaining a substantially similar deflection $D_1$ at 100% of their respective maximum rated load (and/or a substantially similar stop deflection) is to use load beams 332, 338 and 340 having different stiffnesses. Variations in load beam stiffness may be achieved in several ways. In the embodiment shown in FIGS. 9A-9C, for example, load beams 332, 338 and 340 each have a different thicknesses $T_1$, $T_2$ and $T_3$ (measured along the same direction as height $H_1$ along middle regions 332A, 338A and 340A, respectively) which results in a different stiffness for each of load beams 332, 338 and 340. In general, the greater the thickness T at the middle region 332A, 338A or 340A, the greater the stiffness of the respective load beam. The stiffnesses of load beams 332, 338 and 340 are chosen such that the load beams 332, 338 and 340 to have a substantially similar deflection $D_1$ at 100% of their respective maximum rated loads. Accordingly, in this example, the deflection $D_1$ for load beam 332 occurs at a first maximum rated load, the deflection $D_1$ for load beam 338 occurs at a second maximum rated load that is greater than the first maximum rated load, and the deflection $D_1$ for load beam 340 occurs at a third maximum rated load that is greater than the first and second maximum rated loads for load beams 332 and 338 respectively. Alternatively, load beams 332, 338 and 340 may be constructed of different materials to provide the requisite stiffnesses and corresponding deflection $D_1$ at 100% of the respective maximum rated loads.

To create a set of interchangeable load cell assemblies, such as those shown in FIG. 1, a load beam (or multiple load beams) 332 might be installed into load cell assembly 320A, a load beam or beams 338 might be installed into load cell assembly 320B, and a load beam or beams 340 might be installed into load cell assembly 320N, for example, thus creating a set of three interchangeable load cell assemblies, each having a different maximum rated load.

As discussed above, a load cell assembly in accordance with the invention may include any suitable type of load beam. While FIGS. 9A-9C illustrate generally blade-shaped load beams, it shall be understood that the invention described herein may include any suitable type of load beam, and that the invention is not limited in this respect. For example, in other embodiments, a load cell assembly may include other types of load beams, such as a binocular-type load cell ("binocular load cell") or any other suitable shape.

Figure 10:
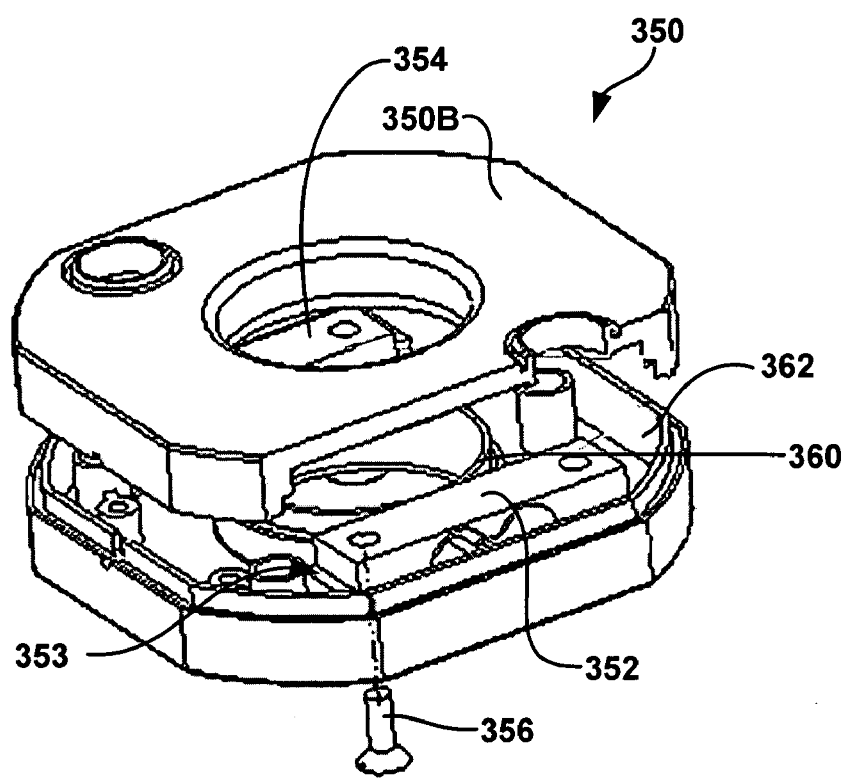
FIGS. 10 and 11 are a perspective view and a schematic cross-sectional view, respectively, of a load cell assembly that includes at least two binocular-type load cells.
Figure 11:
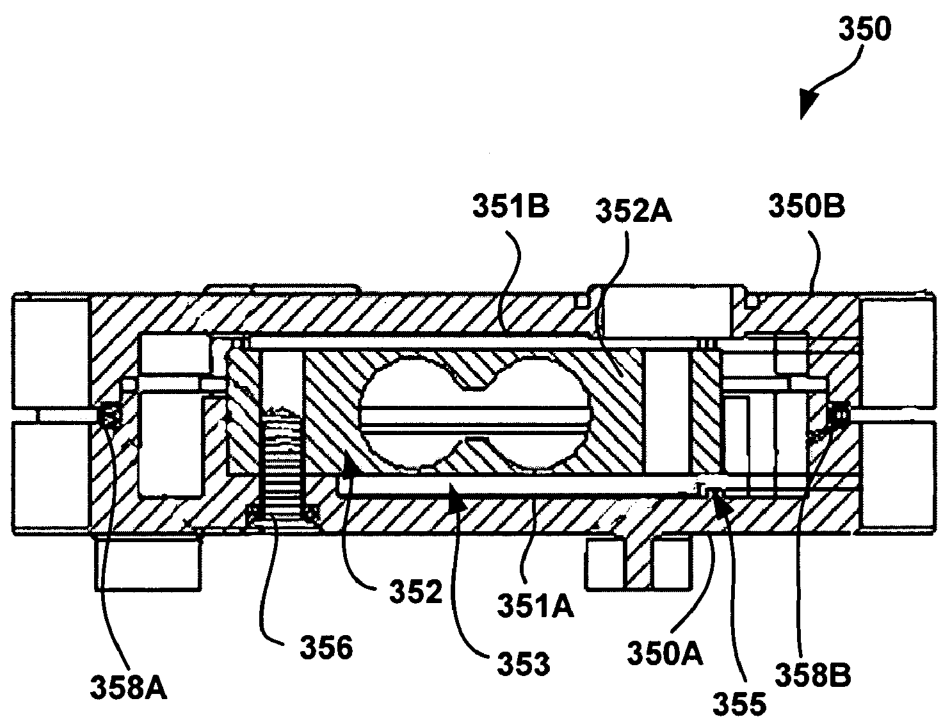

FIGS. 10 and 11 illustrate a perspective view and a schematic cross-sectional view, respectively, of load cell assembly 350, which includes a bottom housing portion 350A, a top housing portion 350B, binocular load beams 352 and 354, and a fastening screw 356, which mechanically couples the load cell 352 to the bottom housing portion 350A. A similar fastening screw may also be used to mechanically couple the load beam 354 to the bottom housing portion 350A. The load cell assembly 350 may also include moisture seals 358A-358B (FIG. 11) to help protect the binocular load cell 352 (as well as the binocular load cell 354) from moisture, which may damage the binocular load cells 354 and 356. The moisture seals 358A-B may be, for example, formed of elastomer or another substantially moisture impermeable material. The bottom housing portion 350A includes a surface 351A, and a top housing portion 350B includes a surface 351B. The bottom housing portion 351A further includes a lock wall 360 and defines an interior wall 362. Load cell assembly 350 may be one of set of interchangeable load cell assemblies having different maximum rated loads, such as load cell assemblies 320A-320N shown in FIG. 1.

While the binocular load cell 352 is referred to throughout the description of FIGS. 10 and 11, it should be understood that a similar description also applies to binocular load cell 354. As FIG. 11 illustrates, the binocular load cell 352 is mounted to the surface 351A of the bottom housing portion 350A by the fastening screw 356 in a cantilevered fashion. As a compressive load is applied to the binocular load cell 352, the end 352A of binocular load cell 352 deflects toward the surface 351A. If a sufficient force is applied to the binocular load cell 352, the free end 352A may eventually contact stop 355 that limits the deflection of the binocular load cell 352 (as well as for the binocular load cell 354, which is not shown in FIG. 11).

The so-called stop deflection, $D_s$ (not shown in FIGS. 9A-9C) is the amount of deflection at a percentage of their respective maximum rated loads at which a physical stop such as stop 355 is placed to prevent overdeflection of load beams 352, 364 and 366. This may be set at any appropriate percentage of the maximum rated load, as long as the resulting deflection is less than that at which damage to the load beam would occur. For example, if load beam damage would occur when the weight borne by the load beam is 200% of the maximum rated load, the stop deflection may be set anywhere between 100% of the maximum rated load and 200% of the maximum rated load, such as 125%, 150%, or 175% of the maximum rated load. In addition, the surface 351B of the top housing portion 350B may act as a stop for limiting the tension or upward deflection of the binocular load cell 352. Like stop 355, surface 351B may be placed at a deflection less than that at which damage to the load beam would occur.

In order to help limit the torsion (i.e., twisting) of the binocular load cells 352 and 354, respective receiving areas 353 (one of which is shown in FIG. 10) of the load cell assembly 350 may include a rotation lock wall 360. In one embodiment, the binocular load cells 352 and 354 are configured to engage with the lock wall 360 and the interior wall 362 of the bottom housing portion 350A when the binocular load cells 352 and 354 are seated within the bottom housing portion 350A of the load cell assembly 350 in order to help prevent binocular load cells 352 and 354 from rotating. In another embodiment, the lock wall 360 and interior wall 362 are configured to enable the binocular load cells 352 and 354 to twist upon the application of a torsional force. However, the lock wall 360 and interior wall 362 may be placed to limit amount of twisting to help prevent damage to and possible failure of the binocular load cells 352 and 354.

Figure 12A:
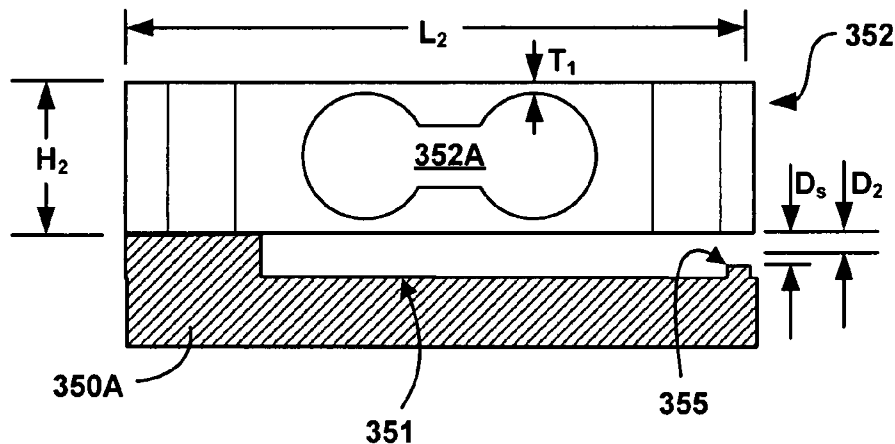
FIGS. 12A-12C are side views of binocular-type load cells that have substantially similar dimensions, geometry, and deflection at a maximum rated load, but have different maximum rated loads.
Figure 12B:
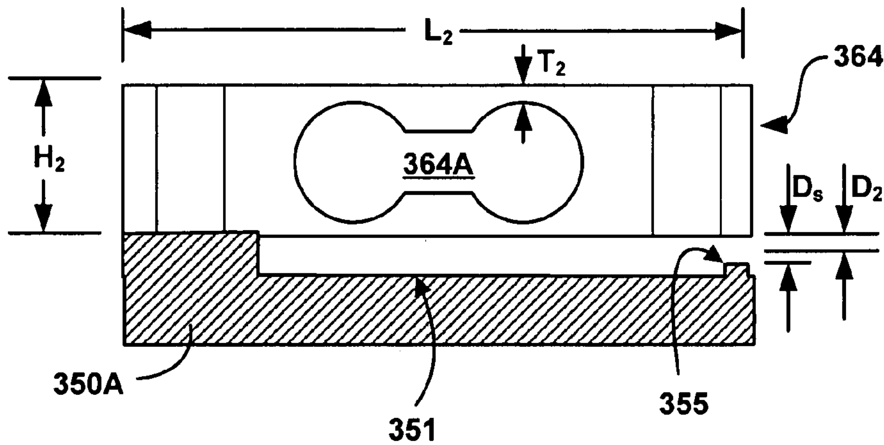
Figure 12C:
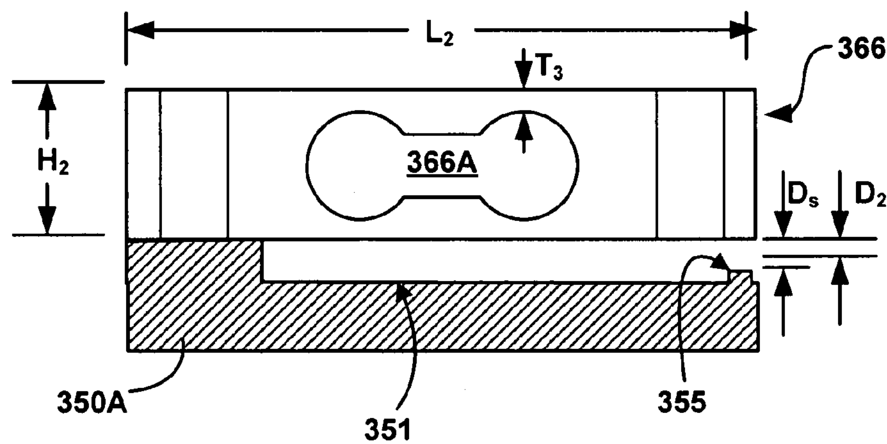

FIGS. 12A-12C are side views of binocular load beams 352, 364 and 366, respectively, each of which may be introduced into a one of a set of interchangeable load cell assemblies, such as load cell assembly 350 of FIG. 10. FIGS. 12A-12C generally illustrate different binocular load beams that have different maximum rated loads and yet have substantially similar external geometries and substantially similar deflection at 100 percent of their respective maximum rated load. Like the blade-type load beams shown and described above with respect to FIGS. 9A-9C, load beams 352, 364 and 366 are configured to be interchangeably received into any one of interchangeable load cell assemblies 320A-320N to create a set of interchangeable load cell assemblies each having a different maximum rated loads. In this example, to allow load beams 352, 364 and 366 to be interchangeably received into any one of load cell assemblies 320A-320N, load beams 352, 364 and 366 have substantially similar external geometries. For example, load beams 352, 364 and 366 each have a substantially similar height $H_2$ and a substantially similar length $L_2$. In addition, load beams 352, 364 and 366 each have substantially similar widths, which are not shown in FIGS. 12A-12C but are measured generally perpendicular to the plane of the image of FIGS. 12A-12C. In addition, load beams 352, 364 and 366 are configured to have a substantially similar deflection $D_2$ at 100% of their respective maximum rated loads.

Like load beams 332, 338 and 340 of FIGS. 9A-9C, load beams 352, 364 and 366 may be configured to have substantially similar "stop deflections," $D_s$. The so-called stop deflection $D_s$ is the amount of deflection at a percentage of their respective maximum rated loads at which a physical stop is placed to prevent overdeflection of load beams 352, 364 and 366. This may be set at any appropriate percentage of the maximum rated load, as long as the resulting deflection is less than that at which damage to the load beam would occur. For example, if load beam damage would occur when the weight borne by the load beam is 200% of the maximum rated load, the stop deflection may be set anywhere between 100% of the maximum rated load and 200% of the maximum rated load, such as 125%, 150%, or 175% of the maximum rated load.

Receiving areas 353A and 353B of load cell assembly 350 are sized to accommodate a binocular load cell having a height $H_2$ and length $L_2$. However, because load cells 352, 364 and 366 have different rated loads, a load cell assembly 350 having a single external housing geometry may be used to provide for a set of interchangeable load cell assemblies having different maximum rated loads for different dispensing applications (i.e., for dispensing products from differently weighted product containers). Thus, in some embodiments, an operator may select a load cell assembly 350 having a suitable rated load from a set of interchangeable load cell assemblies having substantially similar external geometries to incorporate into a dispensing system (e.g., dispenser 200 of FIG. 1) in order to accommodate differently weighted product containers. Multiple assemblies 350 having substantially similar external geometries may also be useful for incorporating into different dispensing systems. For example, an operator may select a dispensing system and subsequently select a load cell assembly having the appropriate maximum rated load from a set of load cell assemblies.

As with the blade-type load beams described above with respect to FIGS. 9A-9C, binocular load beams 352, 364, and 366 have different maximum rated loads but substantially similar deflections at their respective maximum rated loads. The different maximum rated loads may be attributable to the differing stiffness of each load beams 352, 364, and 366, which in the embodiment shown in FIGS. 12A-12C are attributable to the differently sized binocular-shaped openings 352A, 364A and 366A, respectively, in each load cell. In general, the smaller the opening 352A, 364A and 366A, the greater the thickness indicated at dimension T resulting in a greater stiffness of the load cell 352, 364 and 366, respectively and a concomitant greater maximum rated load. Thus, in FIGS. 12A-12C, load beam 352 has a relatively larger opening 352A, resulting in a thickness $T_1$ that is relatively lesser than thicknesses $T_2$ and $T_3$ and thus a relatively lesser maximum rated load than load beams 364 and 366. Similarly, load beam 364 has a relatively smaller opening 364A than opening 352A but a relatively larger opening than opening 366A. Thus, load beam 364 has a thickness $T_2$ that is relatively greater than thickness $T_1$ but smaller than thickness $T_3$, resulting in a maximum rated load that is relatively greater than load beam 352 but relatively less than load beam 366. Load beam 366 has a relatively smaller opening 366A than openings 352A and 364A. Thus, load beam 364 has a thickness $T_3$ that is relatively greater than thicknesses $T_1$ and $T_2$, resulting in a maximum rated load that is relatively greater than both load beams 352 and 364.

In addition to a set of interchangeable load beams comprising multiple blade-type load beams such as those shown in FIGS. 9A-9C, or a set of interchangeable load beams comprising multiple binocular type of load beams such as those shown in FIGS. 12A-12C, a set of interchangeable load beams may also comprise combinations of different types of load beams, such as two blade-type load beams and one binocular load beam, three beams made of different materials, etc. Any arrangement of load beams (regardless of type) sized to be interchangeably received into the housing of the interchangeable load cell assemblies 320A-320N while providing different maximum rated loads will provide for a set of interchangeable load cell assemblies 320A-320N having different maximum rated loads.

A dispenser system and/or a set of interchangeable load cell assemblies for a product dispenser described herein has applicability in many areas in addition to those already discussed. The following is a list of at least some of the areas in which the invention may be used. In each of the examples provided, the interchangeable load cell assemblies having different maximum rated loads may be useful for broadening the applications for which a single dispenser may be used. In the area of pest elimination dispensing equipment, a load cell assembly including one or more load cells could be utilized to measure a pre-set amount of ready-to-use insecticide which would enable the user to document proof of delivery for regulatory compliance, while ensuring a consistent dose was used for each application. Use in the vehicle cleaning market could encompass the use of a chemical measurement device for a vehicle care product dispenser. The product could be in a solid, liquid or gel form. Delivery would be by conventional means such as a recirculating system for solid products or pump systems for liquids or gels. The load cell would measure precise weight changes in the product being delivered from a concentrate to create a ready-to-use solution or an intermediate solution that can be diluted at a user's convenience. The prior art procedures require chemical or volumetric measurements by operators of product usage to ensure reproducible product delivery. As each product type varies greatly in chemical components for vehicle cleaning products, different chemical tests need to be developed and validated for each new product. Batch to batch variations in solid dissolution rates require very stringent quality control measures and greatly restrict new product development of solid systems. Large variations in product use temperature due to seasonal temperature variations in the vehicle cleaning market have negative effects on liquid product viscosities. Water pressure variations within vehicle cleaning sites result in wide changes in product delivery as many dilution systems are based on siphon technology. These variations often result in unacceptable differences in product delivery. All of the variations require human intervention to adjust the chemical delivery system. The use of the load cell technology would permit reproducible delivery of product regardless of chemical composition. This presents the possibilities of greater flexibility and product formulation. Concerns about variation in solid product solubility differences or liquid viscosity changes with temperature would be eliminated as only weight changes are measured. Simplicity of the dispenser design would also result as the same dispenser technology could be used for many product chemistries since chemical measurement systems do not need to be taken into account for each product.

A dispenser described herein may also be useful is in the janitorial and health care areas. The janitorial business would be able to utilize the dispenser system including interchangeable load cells to accommodate a broad range of product container weights for accurately dispensing two or more component chemistries as well as cross linking chemistries for floor care. For health care, the dispenser system would be able to be utilized for proof of delivery for sanitizers and disinfectants. There is also the need to deliver very accurate amounts of chemistry for instrument care and hard surface cleaning. The technology would be available for both liquid and solid products. The dispenser system is also applicable for dispensing products in the housekeeping industry. The dispenser system is useful as a platform for accommodating various accurate solid, liquid or concentrate proportioning when it is used in conjunction with a device that can quantify an amount of water passing through a pipe. For example, if a known volume of water is used, and the load cell could detect the amount of concentrate dispensed, a proportion would be known. So in an accurate dispenser of this kind, the user would set a desired proportion of two or more components. While water is filling up the use vessel, the concentrate is dispensed. Dispensing the concentrate occurs until the proportion is satisfied. If a known amount of water is passed through a pipe in a fixed time, the dispenser could dispense the concentrate to satisfy the proportion. For example, if 100 milliliters of water is passed through the dispenser, a known amount of concentrate would be needed to satisfy the set proportion. The known amount of concentrate could be dispensed and stopped, when the load cell is satisfied.

The present invention is also applicable for laundry systems. Present laundry systems service two machines at a relatively high cost. The system is both complex and costly. The load cell technology of the present invention would reduce both the cost and complexity of a current laundry dispenser. Further, the current laundry system for liquid also has significant drawbacks in that there is no empty drum alarm and no way to compensate for the reduced output of the peristaltic pump dispensing. Load cell technology of the present invention would allow for accurate dispensing of the peristaltic pump over time, providing a signal of when to change the squeeze tube, and allow and empty warning device. The foregoing examples are not an exhaustive list but are just further examples of the applicability of the present invention.

Although specific embodiments of a dispenser system have been shown and described, it shall be understood that other embodiments could be substituted therefore without departing from the scope of the present invention. Various embodiments of the invention have been described. These and other embodiments are within the scope of the following claims.

The invention claimed is:

1. A system comprising:

a dispenser including a housing sized to receive a product to be dispensed based on a weight of the product remaining in the housing; and a set of load cell assemblies, each load cell assembly having a different maximum rated load and sized to be interchangeably received into the dispenser housing to accommodate the dispensing of products having different initial weights, and wherein each of the load cell assemblies further includes a visible marker that indicates the maximum rated load of the respective load cell assembly, the dispenser housing further sized to interchangeably receive any one of the set of load cell assemblies, wherein the one of the load cell assemblies that is received into the housing measures the weight of the product remaining in the housing.

2. The system of claim 1 wherein the set of load cell assemblies further comprise a set of load beams that provide a respective one of the different maximum rated loads, wherein the set of load beams have substantially similar deflections at 100% of the respective maximum rated loads.

3. The system of claim 2 wherein the set of load beams have substantially similar external geometries.

4. The system of claim 1 wherein the set of load cell assemblies have substantially similar external geometries.

5. The system of claim 1 wherein each load cell assembly includes at least one load cell having a maximum rated load that is different from the maximum rated load of the at least one load cell of the other load cell assemblies.

6. The system of claim 1 wherein the load cell assemblies further include substantially similarly sized load cell receiving areas.

7. The system of claim 1 wherein each of the load cell assemblies includes at least one load beam and a strain gauge.

8. The system of claim 1, further comprising a controller that determines the measured weight of the product based on information received from the at least one load cell.

9. The system of claim 1 wherein each of the load cell assemblies further comprises a printed circuit board coupled to receive information from the at least one load cell.

10. The system of claim 1 wherein the visible marker includes at least one of a color coded emblem, a printed graphic or an embedded marker.

11. The system of claim 1 wherein each of the load cell assemblies further includes at least one load cell receiving area configured to limit torsional rotation of the at least one load cell.

12. The system of claim 1 wherein the product includes one of a concentrate, briquettes, powders or blocks.

13. The system of claim 1 wherein the product is contained within a product capsule, wherein the product capsule is sized to be received in the dispenser housing.

14. A system comprising:

a first load cell assembly having a first maximum rated load; and a second load cell assembly having a second maximum rated load;

a dispenser including a housing sized to receive a product to be dispensed based on a weight of the product remaining in the housing;

the first and second load cell assemblies sized to be interchangeably received into the dispenser, wherein each of the first and second load cell assemblies further includes a visible marker that indicates the maximum rated load of the respective load cell assembly, and wherein one of the first load cell assembly or the second load cell assembly that is received into the dispenser determines the weight of the product remaining in the housing.

15. The system of claim 14 wherein the first and second load cell assemblies have substantially similar external geometries.

16. The system of claim 14 wherein each load cell assembly includes at least one load cell.

17. The system of claim 16 wherein each load cell comprises a load beam and a strain gauge.

18. The system of claim 14 wherein the first load cell assembly includes a first load beam and wherein the second load cell assembly includes a second load beam, and wherein the first load beam and the second load beam have substantially similar deflections at 100% of their respective maximum rated load.

* * * * *